(12) United States Patent
Tang et al.

(10) Patent No.: US 8,143,465 B2
(45) Date of Patent: Mar. 27, 2012

(54) SOLUBLE BRANCHED TRIAROYLBENZENE-BASED POLYMER AND ITS SYNTHETIC METHOD

(75) Inventors: Ben Zhong Tang, Hong Kong (CN); Hongchen Dong, Pittsburgh, PA (US); Anjun Qin, Hong Kong (CN); Matthias Haeussler, Hong Kong (CN)

(73) Assignee: The Hong Kong University of Science & Technology, Hong Kong (CN)

( * ) Notice: Subject to any disclaimer, the term of this patent is extended or adjusted under 35 U.S.C. 154(b) by 0 days.

(21) Appl. No.: 11/417,290

(22) Filed: May 2, 2006

(65) Prior Publication Data
US 2006/0247410 A1   Nov. 2, 2006

Related U.S. Application Data

(60) Provisional application No. 60/676,340, filed on May 2, 2005.

(51) Int. Cl.
C07C 15/00 (2006.01)
C07C 45/00 (2006.01)
B01J 19/12 (2006.01)

(52) U.S. Cl. ............... 585/416; 204/157.93; 204/157.61
(58) Field of Classification Search .................... 528/86; 585/416; 204/157.61, 157.93
See application file for complete search history.

(56) References Cited

U.S. PATENT DOCUMENTS

| | | | | |
|---|---|---|---|---|
| 3,882,073 A * | 5/1975 | Cessna, Jr. | | 524/580 |
| 4,070,333 A * | 1/1978 | Jabloner | | 524/529 |
| 4,226,800 A * | 10/1980 | Picklesimer | | 558/419 |
| 4,339,595 A * | 7/1982 | Udovich et al. | | 560/76 |
| 4,987,209 A * | 1/1991 | Neenan et al. | | 526/243 |
| 5,370,974 A | 12/1994 | Agostino et al. | | |
| 5,374,701 A * | 12/1994 | Hay et al. | | 526/285 |
| 5,514,764 A | 5/1996 | Frechet et al. | | |
| 5,594,058 A * | 1/1997 | Olsen et al. | | 524/481 |
| 5,686,027 A * | 11/1997 | Olsen et al. | | 264/29.7 |
| 5,760,266 A * | 6/1998 | Eaton et al. | | 556/136 |
| 6,288,188 B1 * | 9/2001 | Godschalx et al. | | 526/285 |
| 6,646,089 B2 * | 11/2003 | Dvornic et al. | | 528/33 |
| 6,759,502 B1 * | 7/2004 | Tang et al. | | 528/9 |
| 7,049,386 B2 * | 5/2006 | Lau et al. | | 528/86 |
| 7,070,712 B2 * | 7/2006 | Tang et al. | | 252/299.65 |

(Continued)

OTHER PUBLICATIONS

Moikawa, Macromolecules, 1998, 31, 5999-6009.*

(Continued)

*Primary Examiner* — Mark Eashoo
*Assistant Examiner* — Liam Heincer
(74) *Attorney, Agent, or Firm* — George G Wang; Wilkinson & Grist

(57) ABSTRACT

The present invention relates to a novel process of preparing branched polymers by cyclotrimerization and branched organic materials containing triaroylbenzene moieties as base structural unit. The polymerization is a simple one-pot reaction, strictly regioselective and highly functionality-tolerant giving oligomeric and polymeric polymers with high degree of branching (up to 100%) in high yields (up to 99%). The polymers are processible, easily film-forming, transformable (curable) into thermosets by heat or irradiation, and readily crosslinkable by UV irradiation to give patterns with nanometer resolution. The polymers of the present invention can be blend with a variety of macromolecules for general use. The polymers can be metallified utilizing organometallic acetylene as building blocks and ceramization of the patterns of the obtained polymers afford ferromagnetic ceramic patterns with high resolution.

22 Claims, 11 Drawing Sheets

U.S. PATENT DOCUMENTS

| | | | |
|---|---|---|---|
| 2003/0225232 A1* | 12/2003 | Tang et al. | 526/285 |
| 2005/0164899 A1* | 7/2005 | Tang et al. | 510/301 |
| 2006/0199928 A1* | 9/2006 | Tang et al. | 526/285 |
| 2006/0247410 A1* | 11/2006 | Tang et al. | 528/86 |

OTHER PUBLICATIONS

Berthelot, M., Ann. Chim. Phys., 1866, 9, pp. 445-469.

Häußler, M., et al., "Hyperbranched polyarylenes", C.R. Chimie, 6, pp. 833-842, (2003).

Tiwari, R.K., et al., "Nucleophilic addition to aryl ethynyl ketone: addition of oxygen containing nucleophiles to terephthaloyl acetylene", Indian Journal of Chemistry, vol. 35B, pp. 1263-1266, (1996).

Matsuda, K., et al., "Design, synthesis, and characterization of three kinds of π-cross-conjugated hexacarbenes with high-spin (S=6) ground states", J. Am. Chem., Soc, 117, pp. 5550-5560, (1995).

Pigge, F.C., et al., "An Enaminone-directed benzannulation/macrocyclization approach to cyclophane ring systems", J. Org. Chem., 67, pp. 4547-4552, (2002).

Zheng, R., et al., "Construction of hyperbranched poly(alkenephenylene)s by diyne polycyclotrimerization: single-component catalyst, glycogen-like macromolecular structure, facile thermal curing, and strong thermolysis resistance" Macromolecules, 37, pp. 5196-5210, (2004).

Kim, K.H., et al., "Synthesis and characterization of photosensitive polyimides for optical applications", Macromolecules, 34, pp. 8925-8933, (2001).

Hasegawa, M., et al., "Photophysics, photochemistry, and optical properties of polyimides", Prog. Polym. Sci., 26, pp. 259-335, (2001).

Balasubramanian, K.K., et al., "Trimerisation of aryl ethynyl ketones", Synthesis, pp. 29-30, (1980).

Futurrex, Inc., http://www.ee.udel.edu/~xuan/research/public/photoresist_recipe/NR1-3000PY.html., 2 pages, printed Apr. 3, 2008.

Xuan Bao Hao Corporation, http://davidlu.net/msds.htm, 2 pages, printed Apr. 3, 2008.

* cited by examiner

Hyperbranched Poly(aroylarylene) I

SOLUBLE BRANCHED TRIAROYLBENZENE-BASED POLYMER AND ITS SYNTHETIC METHOD

CROSS REFERENCE TO RELATED APPLICATION

Pursuant to 35 U.S.C. §119(e), this application claims priority to U.S. Provisional Application No. 60/676,340, filed May 2, 2005, the contents of which are hereby fully incorporated by reference.

FIELD OF THE INVENTION

The present invention relates to organic materials and their synthesis. More particularly, this invention relates to soluble triaroylbenzene-based branched (co)polymers, the process for producing the (co)polymers, and the process for making cured film, photoresist, pyrolysis and ferromagnetization utilizing the (co)polymers.

BACKGROUND OF THE INVENTION

Because of their substantially globular molecular architectures, hyperbranched polymers are envisioned to possess interesting properties such as low viscosity and high thermal stability and serve as functional materials. Realization of the full potential of hyperbranched polymers calls for the exploration of new, versatile methods for their syntheses. A variety of hyperbranched polymers have been prepared by condensation polymerization of so-called $AB_n$-type ($n \geq 2$) monomers wherein A and B functions condense together to form branched polymers, for instance, hyperbranched polyester and polyamide polymers prepared by Frechet, J. M. J. (U.S. Pat. No. 5,514,764). Competitive reactions, however, often lead to the formation of linear chains, producing imperfect polymers with a low degree of branching and low molecular weight. Cyclotrimerization of alkynes is a reaction in which three alkynes cyclize to form a benzene ring. It was first reported by Berthelot, M. in 1866 (Ann. Chim. Phys., 1866, 9, 445) and has now been developed into a chemo-, regio-, and stereoselective reaction for the synthesis of organic molecules for theoretical and practical interests. Cycloaddition of diacetylenes (or diynes) has been used as an elementary reaction for the construction of hyperbranched polymers with high molecular weight and degree of branching because the polycyclotrimerization mechanism is intolerant of the formation of linear repeat units inside the hyperbranched core. For instance, Olsen, R. E. prepared a novel polyphenylene resin by copolycyclotrimerization of vinylethynylbenzene, diethynylbenzene, and phenylacetylene (U.S. Pat. Nos. 5,686,027 and 5,594,058) initiated by Ziegler catalysts. The obtained polymer is used in the construction of high-performance carbon-carbon composites. However, the reaction system is complex. Ben Zhong Tang's group has successfully synthesized soluble hyperbranched poly(alkenephenylene)s and poly(arylene)s by diyne polycyclotrimerization with tantalum and cobalt complexes as the catalysts (Macromolecules, 2004, 37, 5196 and C. R. Chimie, 2003, 6, 833).

The drawbacks of the method mentioned above are that the polymers produced are regioirregular in structures (random mixtures of 1,3,5- and 1,2,4-trisubstituted benzenes) and the transition-metal catalysts are intolerant to functional groups. To overcome the problems, the present invention utilizes polycyclotrimerizations of diaroylacetylenes to prepare regioselective 1,3,5-triaroylbenzene-based hyperbranched (co) polymers. Cyclotrimerization of benzoylacetylenes was first reported by Balasubramanian, K. (Synthesis, 1980, 29). The reaction is known to proceed in a strictly regioselective way due to the involved ionic mechanism (J. Org. Chem. 2002, 67, 4547). Moreover, the reaction is carried out without using transition-metal catalysts but only in refluxing DMF (dimethylformamide) or using secondary amines as catalysts. It thus may be utilized to prepare hyperbranched polymers from diaroylacetylenes bearing functional groups and cut the production costs tremendously.

The only known example of branched polymer containing triaroylbenzene moieties was reported by Tiwari, R. K. in 1996 (Indian Journal of Chemistry, 1996, 35B, 1263), which was prepared by polycyclotrimerization of terephthaloylacetylene. He aimed to synthesize trans-1,4-bis(3-aryloxy-2-propenoyl)benzenes from base-catalysed addition of phenols to terephthaloylacetylene. However, the reaction yielded large amount of insoluble cyclotrimerized polytribenzoylbenzene. Since the polymer is not processible in most of the organic solvents, it is hard to characterize its structure and find any commercial applications.

Benzophenone has been introduced into natural (e.g., protein) and synthetic polymers (e.g., polyimide) to serve as a photocross-linker. For instance, a preimidized benzophenone photoactive polymer is commercially available as Ciba-Geigy 412. A pattern is then projection exposed on the polymer using a mercury arc lamp at an output of 1200 mJ/cm$^2$ at 365 nm to initiate crosslinking. However, during the development and post-baking, the film swells and shrinks greatly. Thus, patterning of the 412 polymer has been limited to the formation of vias on the order of millimeters in size. Agostino, P. A invented a new method of patterning a preimidized benzophenone photoactive polymer used as a photoresist with a laser light source to increase its crosslinking efficiency and density, thereby resulting in reduced swelling during development (U.S. Pat. No. 5,370,974). But, the resolution is still micronmeter and the resist film must be further heated beyond the flow point to high enough temperatures to initiate widespread thermal crosslinking in the bulk of the resist.

SUMMARY OF THE INVENTION

The present invention provides novel soluble branched (co)poly(aroylarylene)s with high molecular weights and degree of branching by a novel one-spot reaction method. The unique molecular structures of the (co)polymers furnish new materials, with features, such as photoresist and ferromagnetic ceramic patterns with high resolution upon pyrolysis.

Accordingly, an object of the invention is to prepare soluble and therefore processible (hyper)branched high molecular weight polymers containing triaroylbenzene moieties as shown in the general formula (1):

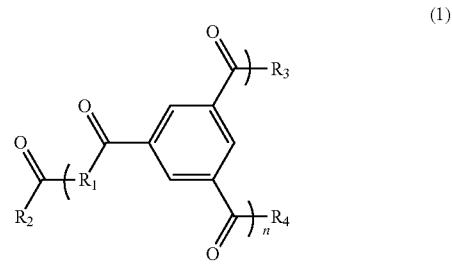

(1)

where $R_1$ is an organic group from the starting diaroylacetylenes and $R_2, R_3$, and $R_4$ represent either triple bonds from unreacted acetylene moieties or other organic groups from end-capping and/or functionalization agents, with n>1. As a person with ordinary skill in the art would understand, in homo-polymerization, $R_1$ is identical in all polymer base units while in copolymerization, $R_1$ may be different in different polymer base units because different starting diaroylacetylenes with different $R_1$ are used. $R_1$ can be any organic group that exists in a compound with at least two carbonylacetylene groups or a compound with one carbonylacetylene group (which will become a capping unit in the polymer). Examples of preferred $R_1$ are as follows:

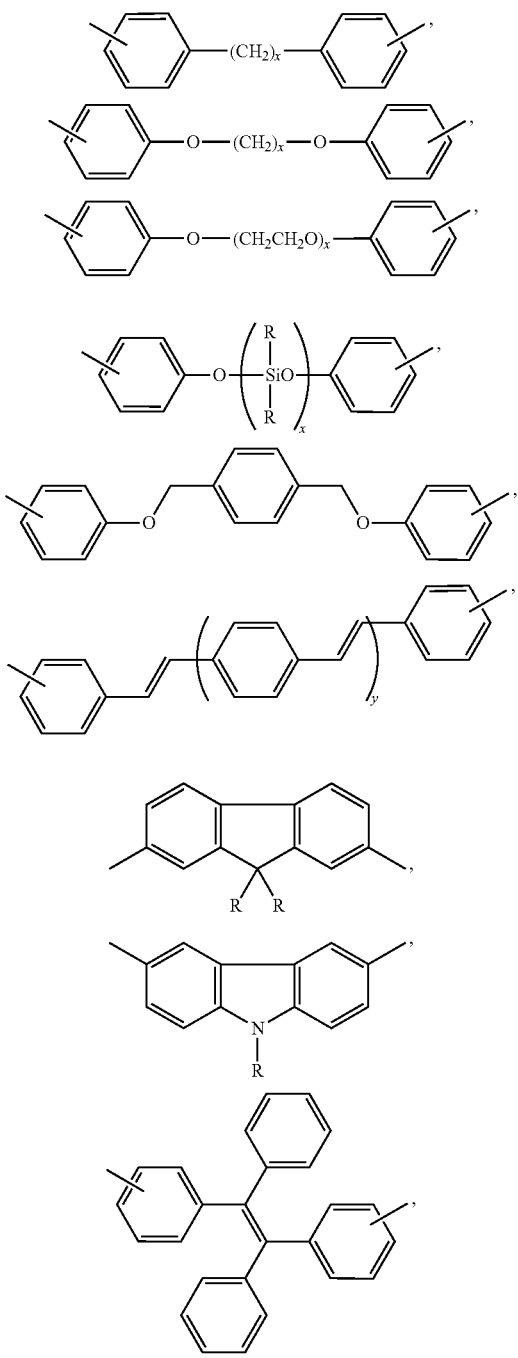

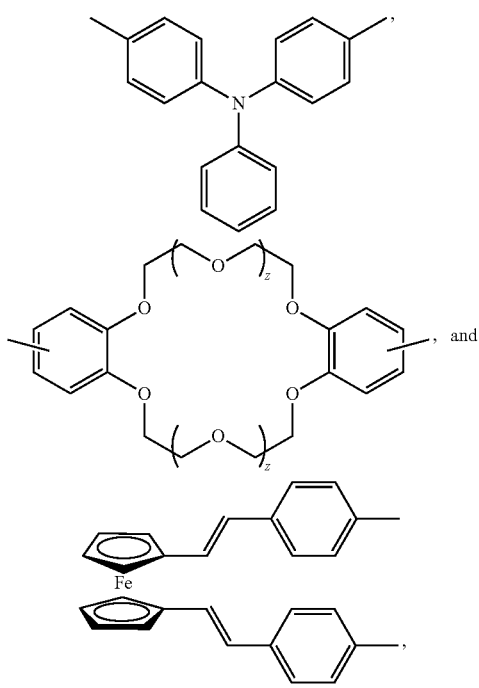

where x, y, and z, are $\geq 1$, preferably within the range between 1 and 20 and most preferably within the range of 6 and 12. R is any suitable organic group determined by people with ordinary skill in the art. Examples of R are: alkyl, vinyl, acetyl, aryl, heteroaryl, cycloalkyl, heterocycloalkyl, and heteroalkyl.

This invention can be extended to almost any compound possessing two or more polymerizable carbonylacetylene functionalities preferentially if they are connected to aromatic or other conjugated structural units. Compounds possessing one carbonylacetylene group may be used in the present invention as comonomer for functionalizing and capping the polymer. Processible materials can be obtained by homo- and copolymerization of diynes with a mixture of monoynes and diynes in different ratios under optimizing reaction conditions such as solvent, polymerization time, temperature, concentration of monomers, and catalyst, which can be ascertained by people of ordinary skill in the art without undue experimentation. For example, larger amounts of monoynes in the reaction will end-cap the polymer and the degree of branching tends to be smaller.

As another objective of the present invention, there is provided a new method to synthesize novel (hyper)branched (co)polymers containing triaroylbenzene units by polycyclotrimerization. The polymerization is a simple one-pot reaction, strictly regioselective, and highly functionality-tolerant, giving oligomeric and polymeric polymers with high degree of branching (up to 100%) in high yields (up to 99%). The polymers are processible, easily film-forming, and transformable (curable) into thermosets by heat or irradiation. The unique triaroylbenzene structures of the polymers may endow them with redox activity and enable them to serve as polymer precursors to organic spintronics and magnets.

Another object of the present invention is the use of the polymers as a new type of photoresist materials with high photosensitivity and resolution.

Another object of the present invention is the use of the polymers as light-emitting and/or optical limiting materials by further incorporating suitable chromophors into the conjugated polymers.

Still another object of the present invention is making a hybrid-polymer by incorporating into the copolymers with metallic species. The formation of such hybrid structures will lead to high metal-loaded organometallic polymers with interesting catalytic, electrical and/or magnetic properties. Upon pyrolysis at elevated temperatures, the patterned hybrid-polymers are transformable into ferromagnetic ceramic patterns with high char yields and resolutions.

The various features of novelty which characterize the invention are pointed out with particularity in the claims annexed to and forming a part of this disclosure. For a better understanding of the invention, its operating advantages, and specific objects attained by its use, reference should be made to the drawings and the following description in which there are illustrated and described preferred embodiments of the invention.

DETAILED DESCRIPTION OF THE INVENTION

Figure 1:
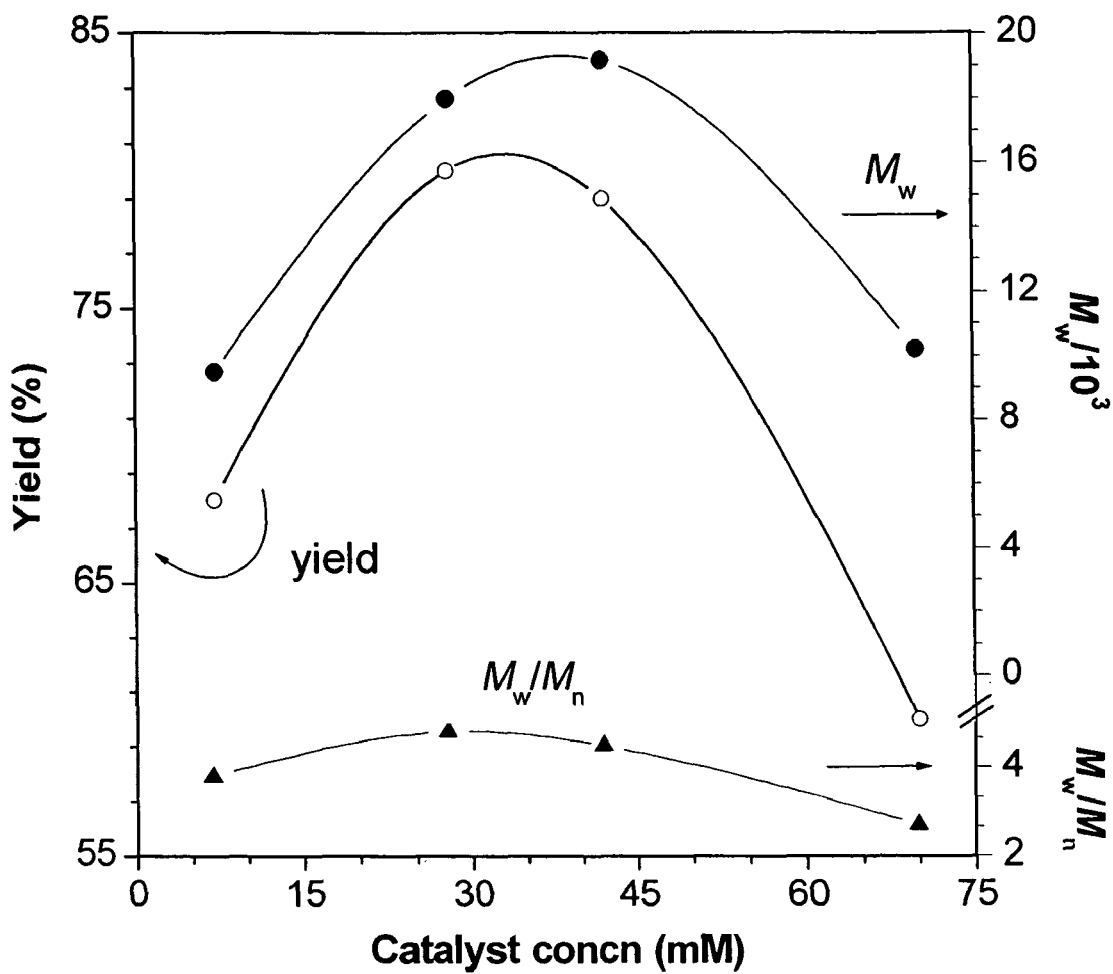
FIG. 1 shows the effect of catalyst concentration [cat.] on the polycyclotrimerization of 3,3'-(1,6-hexylenedioxy) bis (benzoylacetylene) catalyzed by piperidine in dioxane under reflux for 24 h; $[M]_0$=0.14 M.

The following definitions are provided for the purpose of understanding the present invention and the appended patent claims:

"Remainder of a diaroylacetylene" means the organic group of a diaroylacetylene minus two carbonylacetylene groups.

"Remainder of a monoaroylacetylene" means the organic group of a monoaroylacetylene minus one carbonylacetylene groups.

"Diaroylacetylene" is a compound comprising two carbonylacetylene groups and, as a special meaning used in this disclosure, "diaroylacetylene" also means a compound having more than two carbonylacetylene groups.

"Monoynes" means a compound having only one carbonylacetylene group.

"End unit" of the polymer of the present invention means a monoaroylacetylene or diaroylacetylene which has only one carbonylacetylene group participating in polymerization.

"Alkyl" means an aliphatic hydrocarbon group which may be straight or branched chain having about 1 to about 15 carbon atoms in the chain, optionally substituted by one or more halogen atoms. A particularly suitable alkyl group has from 1 to about 6 carbon atoms. The term "unsaturated" refers to the presence of one or more double and triple bonds between atoms of a radical group, for example "Heteroatom" means an atom selected from the group consisting nitrogen, oxygen, sulphur, phosphorus, boron and silicon.

"Heteroaryl" as a group or part of a group denotes an optionally substituted aromatic monocyclic or multicyclic organic moiety of about 5 to about 10 ring members in which at least one ring member is a heteroatom.

"Cycloalkyl" means an optionally substituted non-aromatic monocyclic or multicyclic ring system of about 3 to about 10 carbon atoms.

"Heterocycloalkyl" means a cycloalkyl group of about 3 to 7 ring members in which at least one ring member is a heteroatom.

"Aryl" as a group or part of a group denotes an optionally substituted monocyclic or multicyclic aromatic carbocyclic moiety of about 6 to about 14 carbon atoms, such as phenyl or naphthyl;

"Heteroalkyl" refer to alkyl in which at least one carbon atom is replaced by a heteroatom.

One-Pot Aroylacetylenes Cyclotrimerization. It is known that aroylacetylenes (monoyne) cyclotrimerize when refluxed in DMF or in the presence of diethylamine (J. Org. Chem. 2002, 67, 4547). However, this reaction has not been used for polymerization with diyne precursors to obtain any soluble and processable hyper-branched polymers. When the initially applied to diynes, polymers were formed in relatively low yields after the diaroylacetylenes were refluxed in DMF or its mixtures with other solvents such as toluene and tetralin for a long time (72 h). When the polymerization of 1(m) was carried out in the presence of diethylamine, polymers were obtained in even lower yields (7-21%). In the present invention, piperidine was used. With this new change, not only was a shorter reaction time (24 h) needed to convert diynes into polymers with high molecular weight (up to 31,000), but also surprisingly higher yields (up to 99%) were achieved. All the polymers are completely soluble in common solvents such as tetrahydrofuran, chloroform, and dimethylformamide. The polymers are thermally stable, losing merely 5% of their weights when heated to temperatures as high as 438-454° C. and can be quantitatively converted into thermosets by heating to ~200° C.

From the analyses of dendritic, linear, and terminal structures of the polymers by 1H NMR spectroscopy, it is estimated that polymers have high degree of branching (up to 100%). As proven by the spectroscopic analyses, the diynes have been regioselectively polycyclotrimerized into hyperbranched poly(aroylarylene)s by piperidine. This regioselectivity stems from ionic, instead of coordination, mechanism of the base-catalyzed cyclotrization (J. Am. Chem. Soc. 1995, 117, 5550).

Benzophenone has been introduced into natural (e.g., protein) and synthetic polymers (e.g., polyimide) to serve as a photocross-linker (Prog. Polym. Sci. 2001, 26, 259). The polymers contain many triaroylbenzene (tAB) units and show high photocrosslinking efficiencies. A thin film of the polymer of the present invention on a glass plate can be readily crosslinked by the irradiation with a hand-held UV lamp at room temperature. Though the photocrosslinking conditions have not been optimized, both the polymers already exhibit much higher sensitivities ($D_{0.5}$ down to 50 mJ/cm$^2$) than commercial poly(amic ester) photoresists (650-700 mJ/cm$^2$) (Macromolecules 2001, 34, 8925). Well-resolved patterns with line widths of 1.0 and 1.5 µm are readily obtained when a film of polymer has been exposed to a UV dose of 1 J/cm$^2$. Patterns with submicron resolutions (line width down to 500 nm) are also achievable by an ASML 5000/55A Stepper.

To increase the structural variety, the bridge of two benzoylacetylene groups can be either alkyl chain or the ethylene oxide chains with different lengths to built amphiphlic polymers. But, if the chain is not long enough, the polymers become insoluble. The desired chain length can be determined by people skilled in the art. Moreover, chromophoric groups such as fluorene, carbazole, and triphenylamine can be also introduced into the polymer structure. Such polymers may be usefull as light-emitting and/or optical limiting materials. As one particular embodiment of the present invention, hyperbranched poly(N,N'-bis(4-ethynylcarbonylphenylene) aniline) emits green-yellow light with a quantum yield of 30%.

Copolymerization of diynes and organometallic monoaroylacetylenes (such as ferrocene carbonylacetylene) gives hyperbranched hybrid-polymers with organometallic compounds as the end-capping groups. The metallic content in the polymers can be varied with ease by changing the ratio of diyne and monoyne. Upon pyrolysis at elevated temperatures, the patterned hybrid-polymer is transformable into ferromagnetic ceramic pattern with high char yield and micrometer resolution.

SCHEMES

SCHEME 1:
Synthesis of monomers with flexible linker

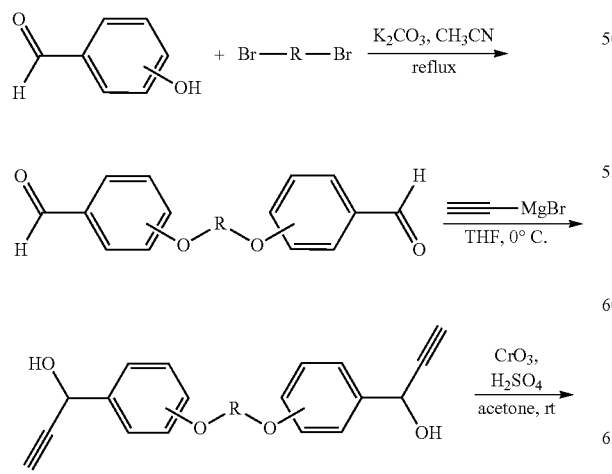

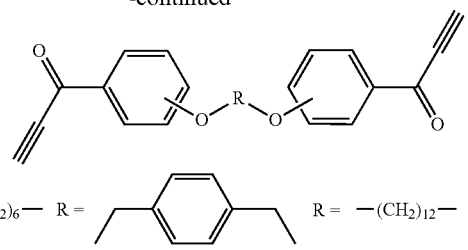

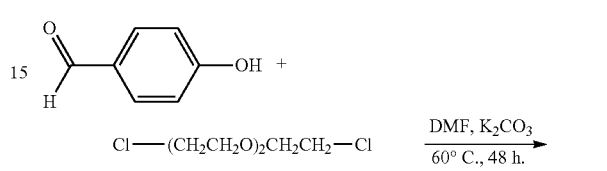

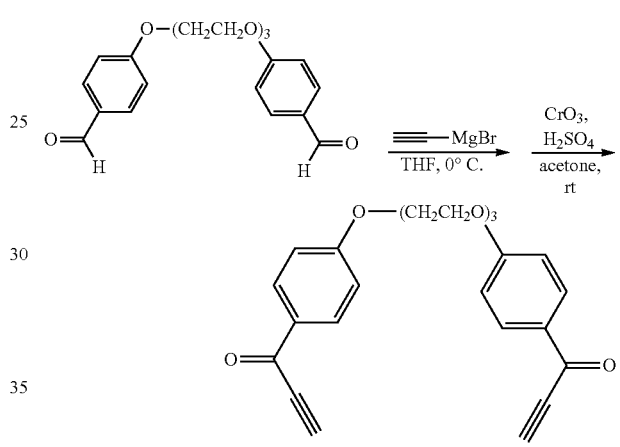

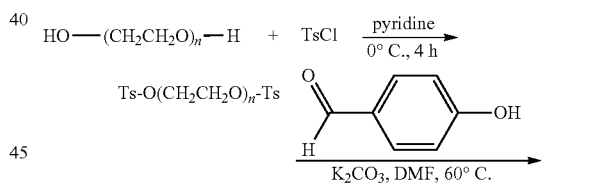

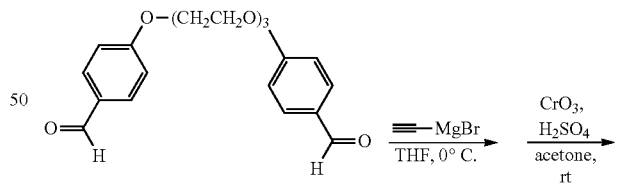

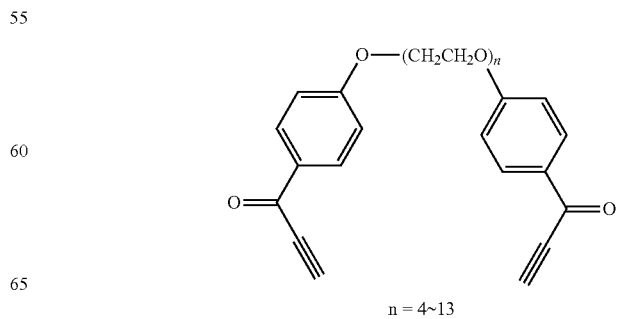

SCHEME 2:
Synthesis of monomers with conjugated and/or organometallic linkers
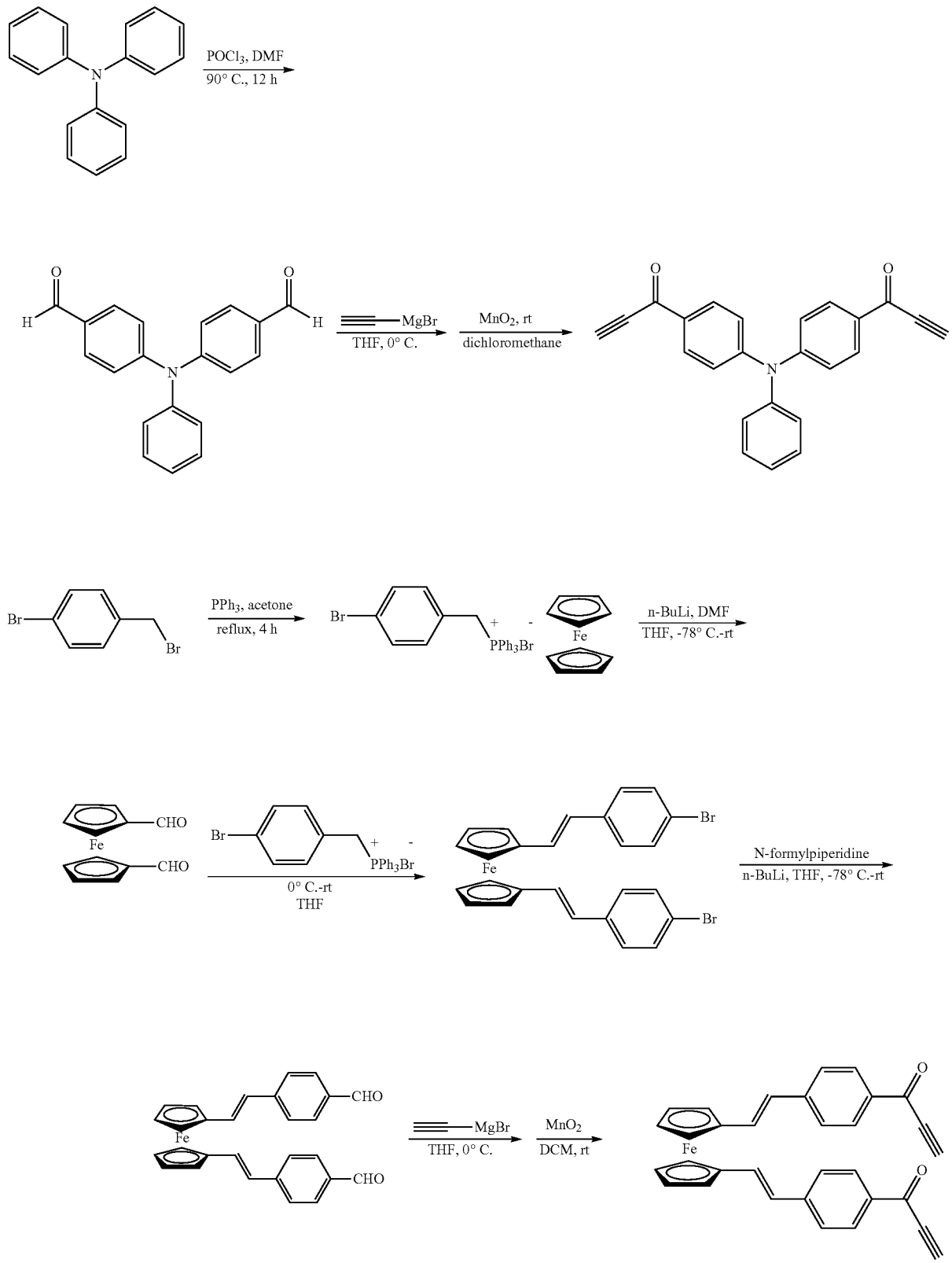

Scheme 3:
Synthesis of monomers with different aromatic linkers
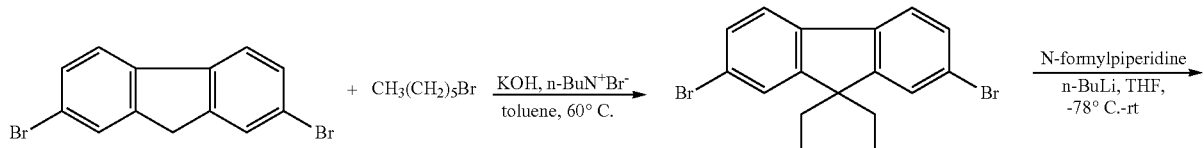
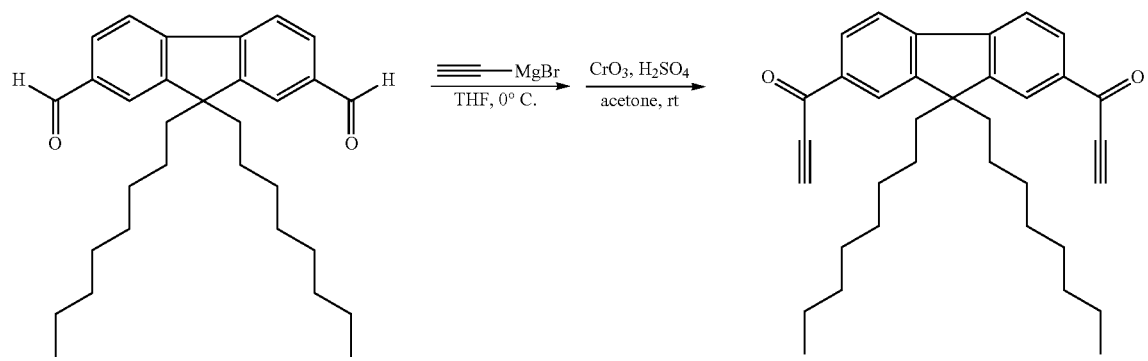
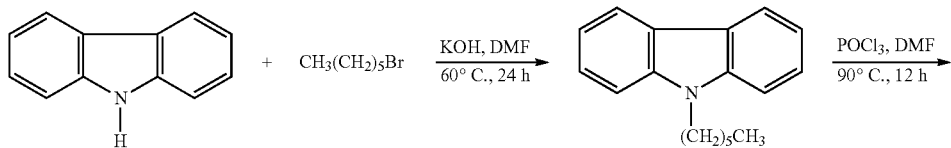
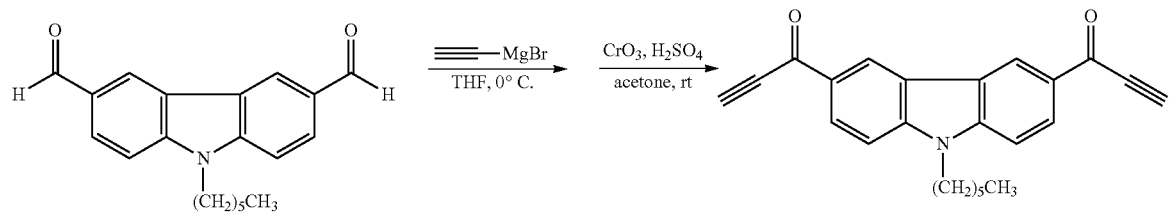

SCHEME 4:
Polycyclotrimerization of diyne monomers to hyperbranched polymers containing triaroylbenzene moieties
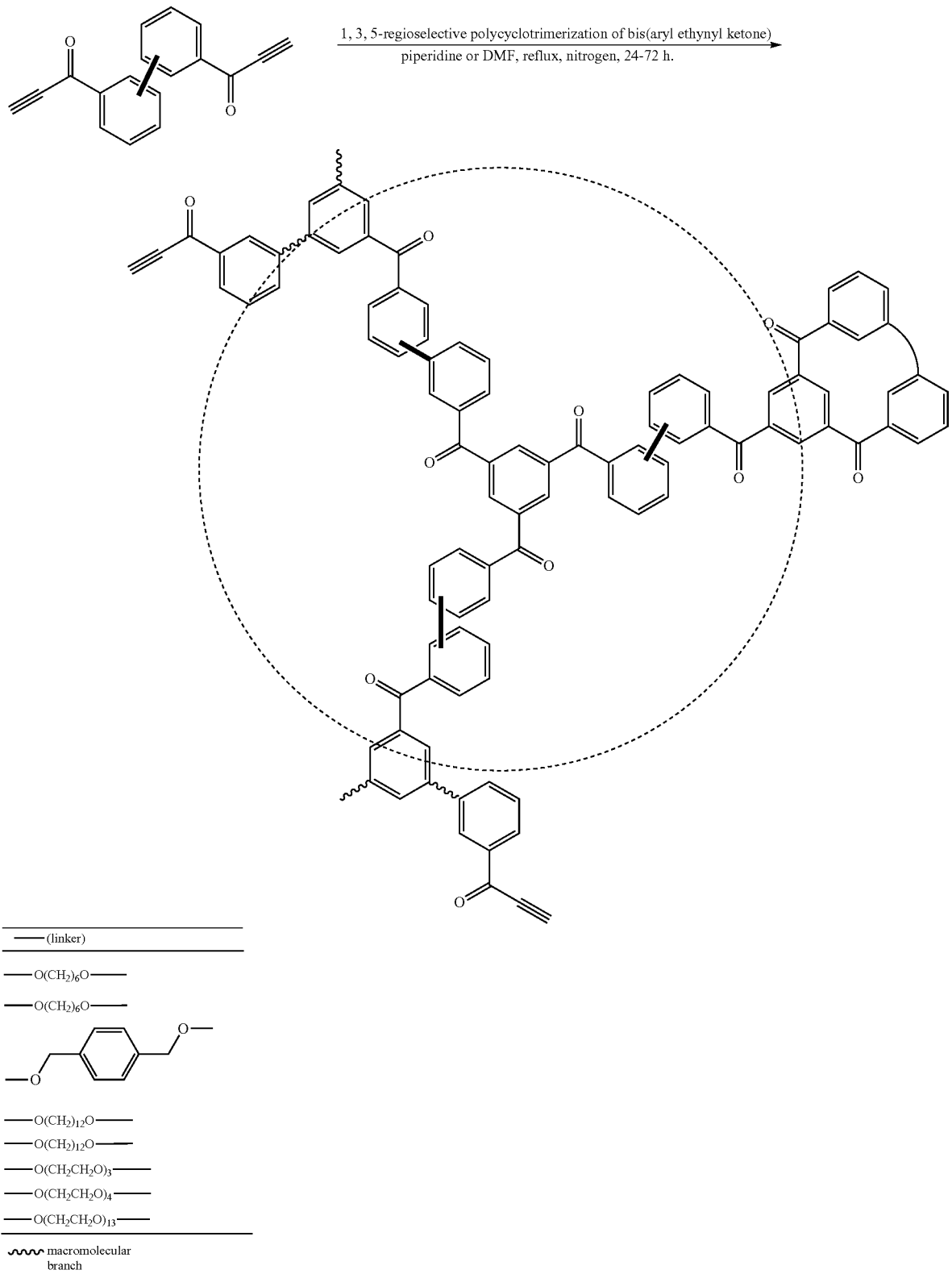

SCHEME 5:
Polycyclotrimerization of diyne monomers containing conjugated chromophores and organometallic groups to hyperbranched polymers containing triaroylbenzene moieties.
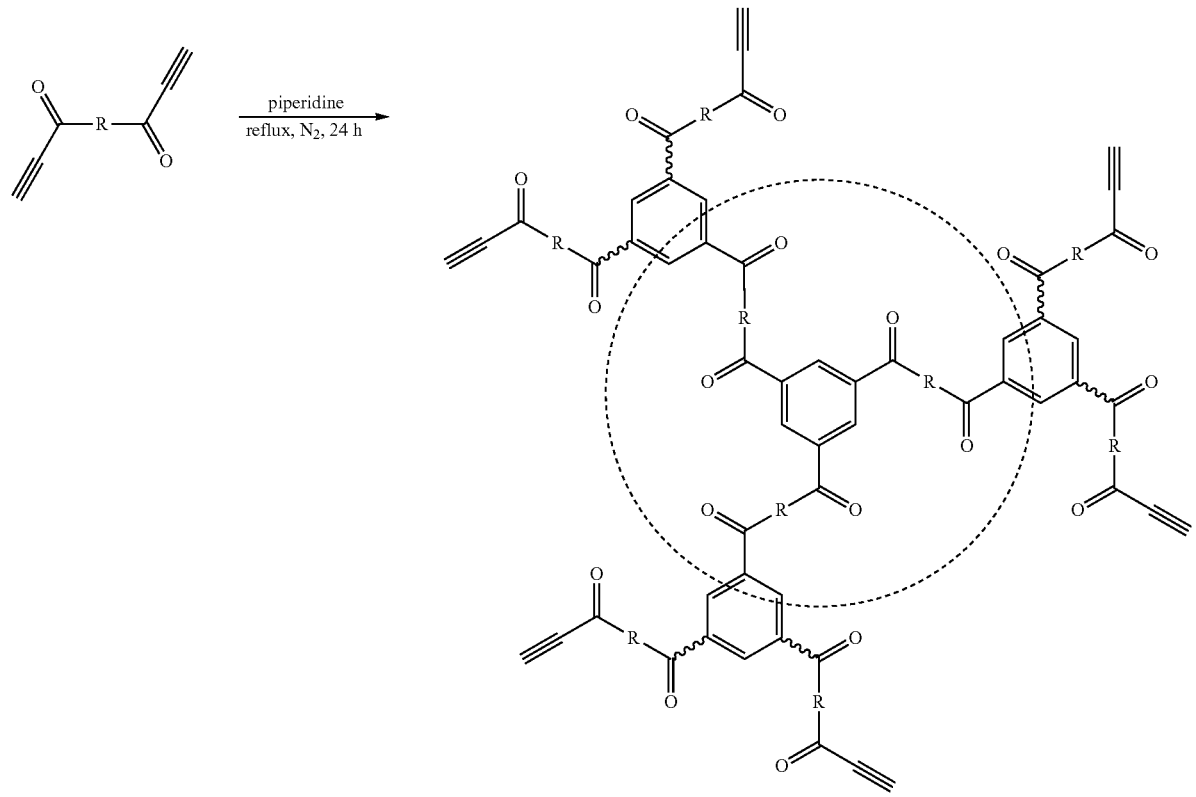
R =
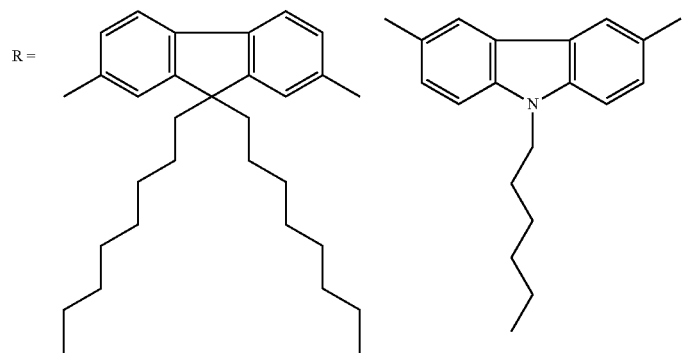
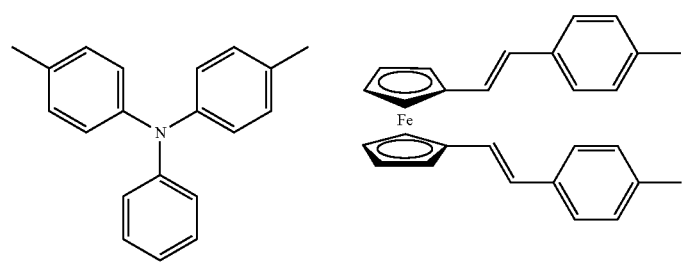

In all the above depicted schemes, precursors may be substituted by people ordinarily skilled in the art to afford various substituted compounds of the present invention.

EXAMPLES

Example 1

Hyperbranched poly[3,3'-(1,6-hexylenedioxy) bis(benzoylacetylene)] (I)

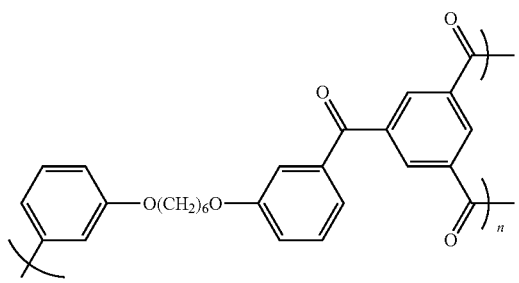

In a 15 mL Schlenk tube with a three-way stopcock on the sidearm was placed 100 mg of 3,3'-(1,6-hexylenedioxy) bis(benzoylacetylene) (0.267 mmol) under nitrogen in a glovebox. Distilled dioxane (1.9 mL) was injected into the tube using a hypodermic syringe, followed by the addition of a solution of piperidine (0.267 mM) in dioxane (0.30 mL). The mixture was stirred under reflux for 24 h. Afterwards, the polymerization mixture was added dropwise to ~300 mL methanol through a cotton filter under stirring. The precipitate of the polymer was allowed to stand overnight and was then collected by filtration. The isolated polymer was washed with methanol and dried under vacuum at room temperature to a constant weight.

Characterization data: Brown power, yield: 79%. $M_w$: 19200, $M_w/M_n$: 4.5 (GPC, polystyrene calibration). IR (thin film), ν (cm$^{-1}$): 3243 (≡C—H stretching), 3067 (Ar—H stretching), 2940, 2867 (CH$_2$ stretching), 2095 (C≡C stretching), 1667 (C═O stretching), 1580, 1485 (C═C ring stretching). $^1$H NMR (300 MHz, CD$_2$Cl$_2$), δ (ppm): 8.43, 8.33, 7.91, 7.72, 7.59, 7.40, 6.92, 4.00, 3.50, 1.78, 1.52. $^{13}$C NMR (75 MHz, CDCl$_3$), δ (ppm): 195.39, 194.93, 165.52, 159.75, 159.07, 156.18, 138.45, 134.33, 133.84, 133.34, 130.58, 129.84, 122.95, 121.89, 121.26, 120.14, 117.58, 115.84, 114.01, 107.97, 81.36, 68.58, 29.45, 28.10, 26.55, 24.83, 20.69.

Example 2

Hyperbranched poly[4,4'-(1,6-hexylenedioxy) bis(benzoylacetylene)] (II)

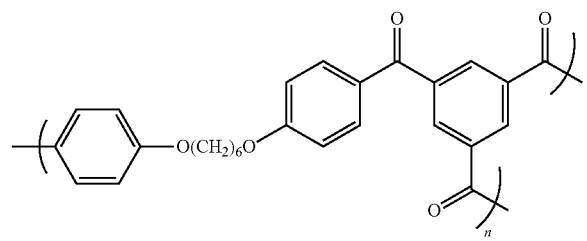

Homopolymerization of 4,4'-(1,6-hexylenedioxy) bis(benzoylacetylene) was carried out in accordance with the same procedure as described in Example 1 with 100 mg (0.267 mmol) 4,4'-(1,6-hexylenedioxy) bis(benzoylacetylene) instead of 3,3'-(1,6-hexylenedioxy) bis(benzoylacetylene).

Characterization data: Yellow power, yield: 65%. $M_w$: 9100, $M_w/M_n$: 4.0 (GPC, polystyrene calibration). IR (thin film), ν (cm$^{-1}$): 3066 (Ar—H stretching), 2941, 2867 (CH$_2$ stretching), 1661 (C═O stretching), 1600, 1574 (C═C ring stretching). $^1$H NMR (300 MHz, CD$_2$Cl$_2$), δ (ppm): 8.47, 8.31, 8.22, 7.80, 6.94, 4.00, 1.80, 1.51. $^{13}$C NMR (75 MHz, CDCl$_3$), δ (ppm): 193.97, 163.70, 162.65, 139.07, 137.75, 133.66, 132.88, 132.39, 129.45, 114.87, 68.66, 67.89, 29.37, 27.99, 26.09, 24.88.

Example 3

Hyperbranched poly[3,3'-(1,4-phenylenedimethoxy) bis(benzoylacetylene)] (III)

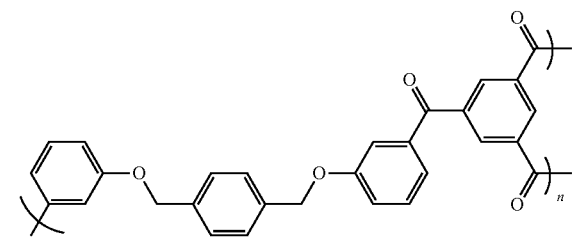

Homopolymerization of 3,3'-(1,4-phenylenedimethoxy) bis(benzoylacetylene) was carried out in accordance with the same procedure as described in Example 1 with 100 mg (0.254 mmol) instead of 3,3'-(1,4-phenylenedimethoxy) bis(benzoylacetylene) instead of 3,3'-(1,6-hexylenedioxy) bis(benzoylacetylene).

Characterization data: Yellow power, yield: 85%. $M_w$: 15000, $M_w/M_n$: 4.0 (GPC, polystyrene calibration). IR (thin film), ν(cm$^{-1}$): 3064 (Ar—H stretching), 2927, 2872 (CH$_2$ stretching), 1667 (C═O stretching), 1581, 1485 (C═C ring stretching). $^1$H NMR (300 MHz, CD$_2$Cl$_2$), δ (ppm): 8.32, 8.27, 7.34, 7.17, 5.04. $^{13}$C NMR (75 MHz, CDCl$_3$), δ (ppm): 194.65, 159.23, 158.26, 138.90, 138.20, 137.17, 134.34, 132.65, 130.09, 128.06, 123.32, 122.05, 120.35, 117.99, 115.82, 71.51, 70.16.

Example 4

Hyperbranched poly[4,4'-(ethylenedioxydiethoxy) bis(benzoylacetylene) (IV)

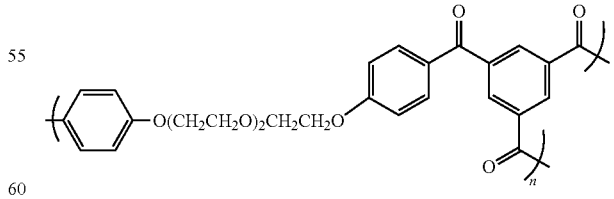

Homopolymerization of 4,4'-(ethylenedioxydiethoxy) bis(benzoylacetylene) was carried out in accordance with the same procedure as described in Example 1 with 100 mg 4,4'-(ethylenedioxydiethoxy) bis(benzoylacetylene) (0.254 mmol) of instead of 3,3'-(1,6-hexylenedioxy) bis(benzoylacetylene).

Characterization data: Brown power, yield: 80%. $M_w$ 15600; $M_w/M_n$ 4.9 (GPC, polystyrene calibration). IR (KBr), ν (cm$^{-1}$): 3011 (Ar—H stretching), 2931, 2875 (CH$_2$ stretching), 1658 (C=O stretching), 1600, 1508 (C=C ring stretching). $^1$H NMR (300 MHz, CDCl$_3$), δ (ppm): 8.53, 8.27, 7.82, 7.00, 4.20, 3.88, 3.75. $^{13}$C NMR (75 MHz, CDCl$_3$), δ (ppm): 193.65, 162.89, 133.10, 132.00, 129.19, 114.42, 70.80, 69.44, 67.80, 67.63.

Example 5

Hyperbranched poly[4,4'-(PEG-dioxide) bis(benzoylacetylene)] (V)

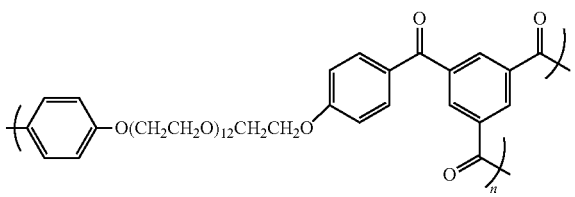

Homopolymerization of 4,4'-(PEG-dioxide) bis(benzoylacetylene) was carried out in accordance with the same procedure as described in Example 1 with 100 mg (0.117 mmol) of 4,4'-PEG-dioxide bis(benzoylacetylene) instead of 3,3'-(1,6-hexylenedioxy) bis(benzoylacetylene).

Characterization data: Yellow elastomer, yield: 50%. $M_w$ 6100; $M_w/M_n$ 1.7 (GPC, polystyrene calibration). $^1$H NMR (300 MHz, CDCl$_3$), δ (ppm): 8.26, 7.86, 7.83, 7.45, 7.03, 7.00, 4.22, 3.79, 3.63.

Example 6

Hyperbranched poly[(9,9'-di-n-hexyl)-2,7-diethynyl-carbonylfluorene] (VI)

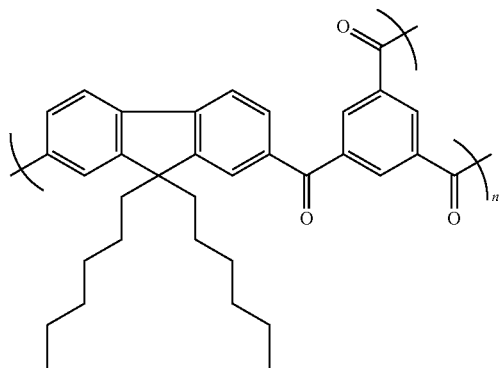

Homopolymerization of (9,9'-di-n-hexyl)-2,7-diethynyl-carbonylfluorene was carried out in accordance with the same procedure as described in Example 1 with 100 mg (0.228 mmol) of (9,9'-di-n-hexyl)-2,7-diethynylcarbonylfluorene instead of 3,3'-(1,6-hexylenedioxy) bis(benzoylacetylene).

Characterization data: Yellow powder, yield: 84%. $M_w$ 46100; $M_w/M_n$ 5.1 (GPC, polystyrene calibration). IR (KBr), ν (cm$^{-1}$): 2925, 2854 (CH$_2$ stretching), 1655 (C=O stretching), 1605 (C=C ring stretching). $^1$H NMR (300 MHz, CDCl$_3$), δ (ppm): 8.48, 8.27, 8.16, 8.00, 7.91 3.50, 2.07, 1.04, 0.78, 0.61. $^{13}$C NMR (75 MHz, CDCl$_3$), δ (ppm): 194.6, 177.1, 152.8, 145.6, 136.2, 130.3, 124.7, 123.5, 120.8, 80.8, 55.7, 39.9, 31.7, 29.8, 23.9, 22.5, 14.0.

Example 7

Hyperbranched poly[N,N'-bis(4-ethynylcarbonylphenylene)aniline] (VII)

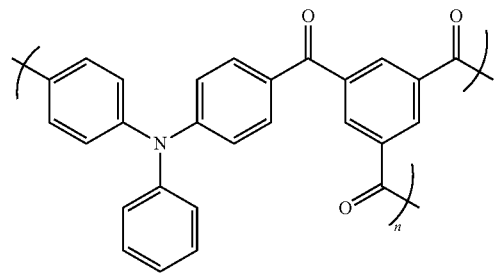

Homopolymerization of N,N'-bis(4-ethynylcarbonylphenylene)aniline was carried out in accordance with the same procedure as described in Example 1 with 140 mg (0.254 mmol) of N,N'-bis(4-ethynylcarbonylphenylene)aniline instead of 3,3'-(1,6-hexylenedioxy) bis(benzoylacetylene).

Characterization data: Brown power, yield: 86%. $M_w$ 11300; $M_w/M_n$ 2.8 (GPC, polystyrene calibration). IR (KBr), ν (cm$^{-1}$): 3036.7, 2939.8, 1651.7, 1587.6, 1505.5, 1319.5, 1271.6, 753.4, 697.7. $^1$H NMR (300 MHz, CDCl$_3$), δ (ppm): 8.56, 8.31, 8.03, 7.74, 7.36, 7.16, 5.78, 3.45.

Example 8

Hyperbranched poly[4,4'-(1,1'-ferrocenylenedi-2-vinyl) bis(benzoylacetylene)] (VIII)

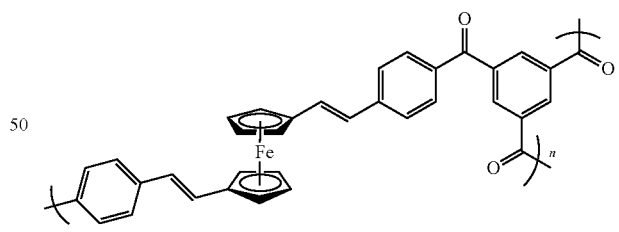

Homopolymerization of 4,4'-(1,1'-ferrocenylenedi-2-vinyl) bis(benzoylacetylene) was carried out in accordance with the same procedure as described in Example 1 with 100 mg (0.202 mmol) of 4,4'-(1,1'-ferrocenylenedi-2-vinyl) bis(benzoylacetylene) instead of 3,3'-(1,6-hexylenedioxy) bis(benzoylacetylene).

Characterization data: Red power, yield: 72%. $M_w$ 9100; $M_w/M_n$ 2.9 (GPC, polystyrene calibration). IR (KBr), ν (cm$^{-1}$): 3013.0, 1660.4, 1598.6, 1403.4, 1255.0, 752.9. $^1$H NMR (300 MHz, CDCl$_3$), δ (ppm): 8.36, 7.75, 7.42, 6.93, 6.70, 6.43, 6.34, 4.56, 4.00, 3.36.

Example 9

Hyperbranched poly{[3,3'-(1,4-phenylene-dimethoxy) bis(benzoylacetylene)]-co-ferrocene carbonylacetylene)} (IX)

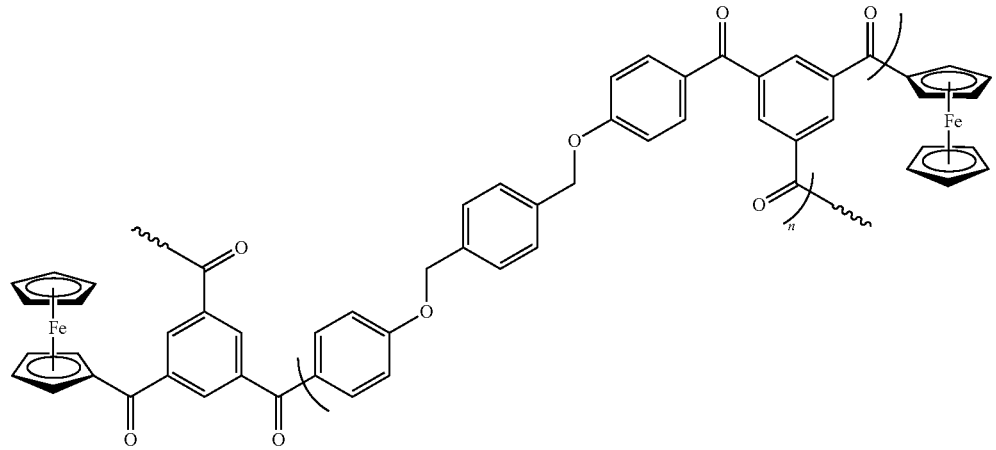

Copolymerization of 3,3'-(1,4-phenylenedimethoxy) bis(benzoylacetylene) and ferrocene carbonylacetylene was carried out in accordance with the same procedure as described in Example 3 with the addition of 181 mg (0.762 mmol) ferrocene carbonylacetylene.

Characterization data: Red power, yield: 64%. $M_w$ 7600; $M_w/M_n$ 3.2 (GPC, polystyrene calibration). IR (KBr), ν (cm$^{-1}$): 3083.5, 3014.2, 2867.7, 1648.6, 1599.0, 1449.3, 1420.3, 1309.2, 1251.4, 1169.0, 1000.9, 843.0, 754.5. $^1$H NMR (300 MHz, CDCl$_3$), δ (ppm): 8.77, 8.67, 8.58, 8.53, 8.47, 8.39, 8.30, 8.28, 8.13, 8.11, 7.89, 7.86, 7.50, 7.05, 5.16, 4.92, 4.88, 4.64, 4.29, 4.26. $^{13}$CNMR (75 MHz, CDCl$_3$), δ (ppm): 197.8, 193.9, 162.7, 139.7, 138.6, 136.1, 133.1, 132.1, 131.2, 129.5, 127.8, 115.9, 114.7, 90.2, 73.1, 71.5, 70.4.

Example 10

Magnetoceramic from VIII-precursor (X)

Ceramics X was fabricated from hyperbranched poly poly [4,4'-(1,1'-ferrocenylenedi-2-vinyl) bis(benzoylacetylene)] precursor VIII by pyrolysis in a Lindberg/Blue tube furnace with a heating capacity up to 1000° C. In a typical ceramization experiment. 37.5 mg of VIII was placed in a porcelain crucible, which was heated to 1000° C. at a heating rate of 10° C./min under a steam of nitrogen (0.2 L/min). The sample was sintered for 1 h at 1000° C. and black ceramic X was obtained in 58.1% yield (21.8 mg) after cooling.

Example 11

Magnetoceramic from IX-precursor (XI)

Ceramics XI was prepared by a similar pyrolysis procedure from poly{[3,3'-(1,4-phenylenedimethoxy) bis(benzoylacetylene)]-co-(ferrocenecarbonyl-acetylene)} IX at a temperature of 1000° C. Yield: 57.8%.

TABLE 1

Synthesis of hyperbranched poly(aroylarylene)s[a]

| no. | polymer | [M]$_0$ (mol/L) | yield (%) | $M_w^b$ (×10$^{-3}$) | PDI[b] |
|---|---|---|---|---|---|
| 1 | I | 0.14 | 79 | 19.2 | 4.5 |
| 2 | II | 0.14 | 65 | 9.1 | 4.0 |
| 3 | III | 0.14 | 85 | 15.0 | 4.0 |
| 4 | IV | 0.18 | 80 | 15.6 | 4.9 |
| 5 | V | 0.12 | 50 | 6.1 | 1.7 |
| 6 | VI | 0.08 | 84 | 46.1 | 5.1 |
| 7 | VII | 0.10 | 86 | 11.3 | 2.8 |
| 8 | VIII | 0.14 | 72 | 9.1 | 2.9 |
| 9 | IX | 0.14 | 64 | 7.6 | 3.2 |

[a]Catalyzed by piperidine in dioxane under reflux for 24 h in nitrogen. Abbreviation: PDI = polydispersity index.
[b]Determined by GPC in THF on the basis of a polystyrene calibration.

As mentioned in the above, it is known that an aroylacetylene (monoyne) cyclotrimerizes when refluxed in DMF or in the presence of diethylamine. We tried to polymerize bis(aroylacetylene)s (diynes) under these conditions. Polymers were formed in relatively low yields after the diynes were refluxed in DMF or its mixtures for a long time (72 h). When the polymerization of 3,3'-(1,6-hexylenedioxy) bis(benzoylacetylene) was carried out in the presence of diethylamine, polymers were obtained in even lower yields (7-21%). We tried to shorten the reaction time and increase the polymer yield by using other bases as catalysts. When diphenylamine was used, no polymerization occurred at all.

Figure 2:
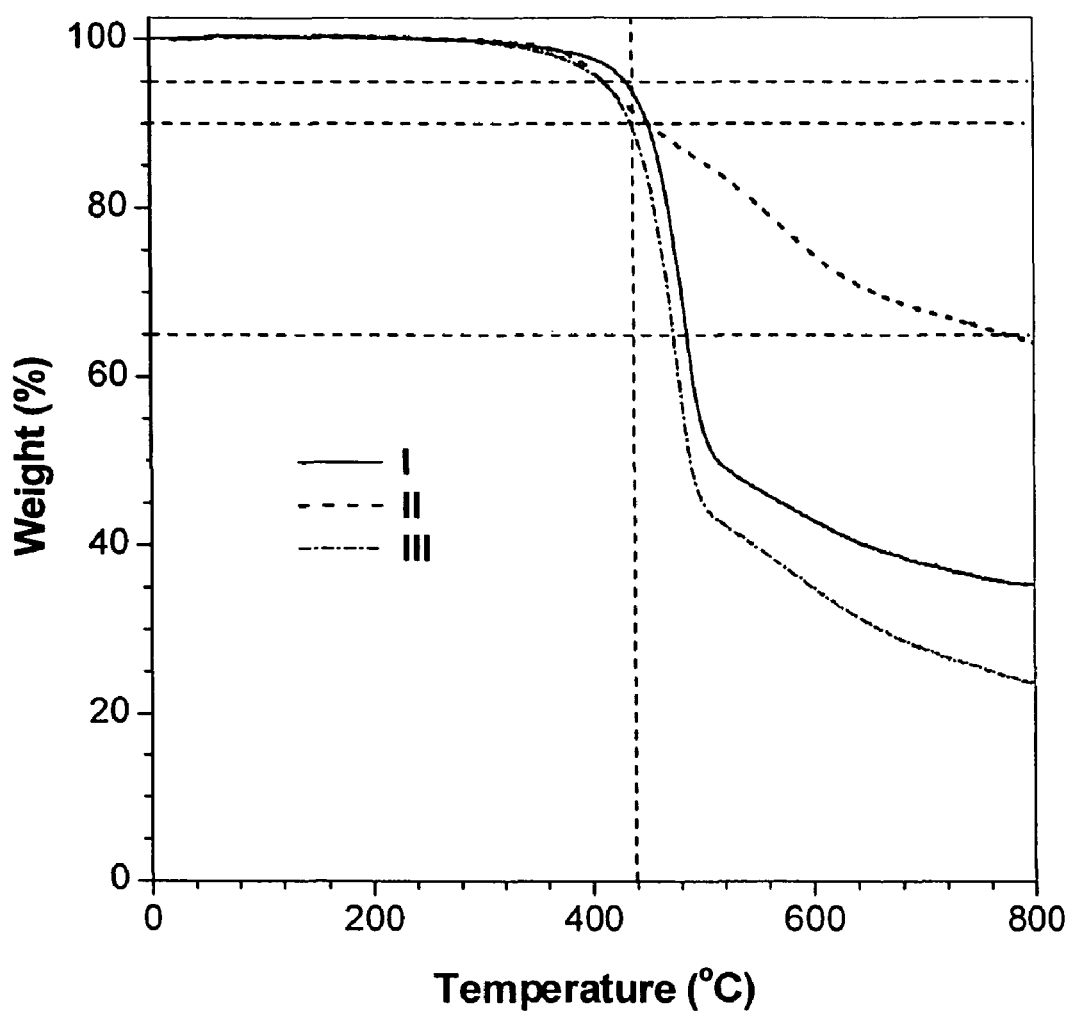
FIG. 2 is TGA thermograms of hyperbranched poly(aroylarylene)s I-III recorded under nitrogen at a heating rate of 20° C./min.

Surprisingly, however, when piperidine was used, a shorter reaction time (24 h) converted the diynes into polymers in higher yields (Table 1). The effect of catalyst concentration ([cat.]) was studied, and it was found that the best results were obtained at [cat.]~42 mM (FIG. 1). At this [cat.], other diynes were polymerized, demonstrative of the usefulness of piperidine as a catalyst for diyne polycyclotrimerization. All the polymers are completely soluble in common solvents such as THF, chloroform, and DMF. The polymers are thermally stable, losing merely 5% of their weights when heated to temperatures as high as 438-454° C. (FIG. 2). They undergo glass transitions at ~79-103° C. and can be quantitatively converted into thermosets by heating to ~200° C.

Figure 3:
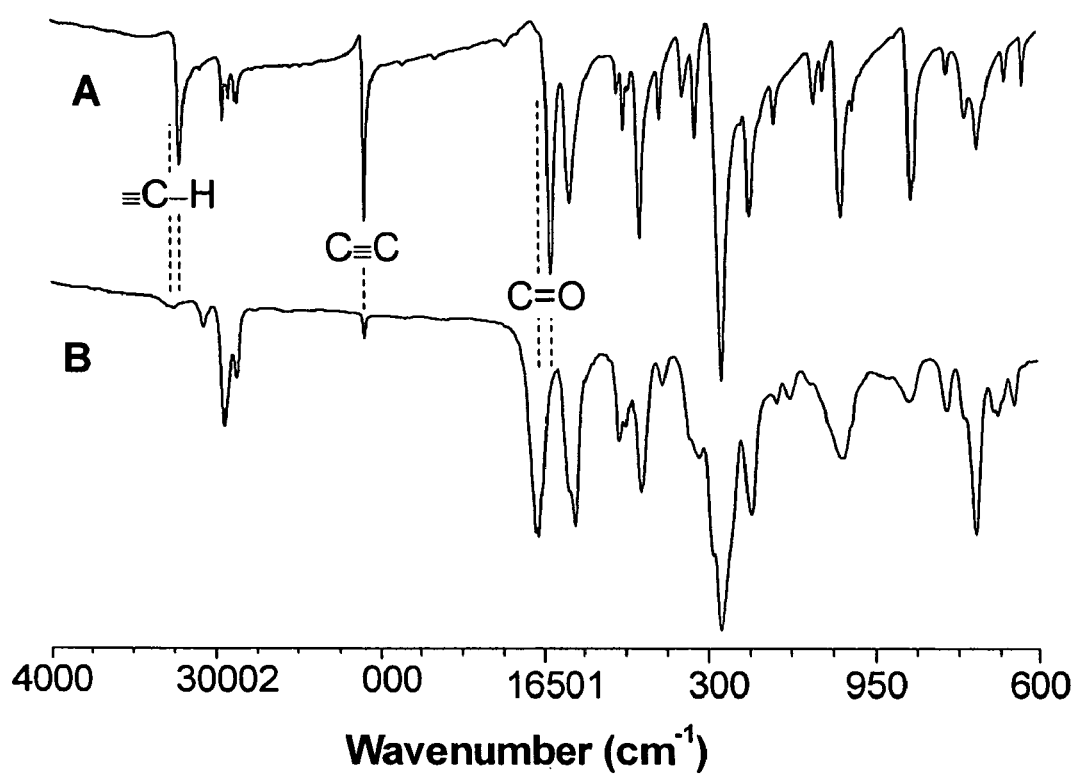
FIG. 3 is IR spectra of 3,3'-(1,6-hexylenedioxy) bis(benzoylacetylene) (A) and its polymer I (B).

To collect direct structure information, the polymers were characterized by spectroscopic methods. Examples of the IR spectra of I and its monomer are given in FIG. 3. The diyne monomer, 3,3'-(1,6-hexylenedioxy) bis(benzoylacetylene), shows absorption bands at 3211 and 2093 $cm^{-1}$ due to ≡C—H and C≡C stretchings, respectively. These bands are still observable in the spectrum of its polymer I at similar wavenumbers but in lower intensities because most of the triple bonds have been converted to the benzene rings by the diyne polycyclotrimerization.

Figure 4:
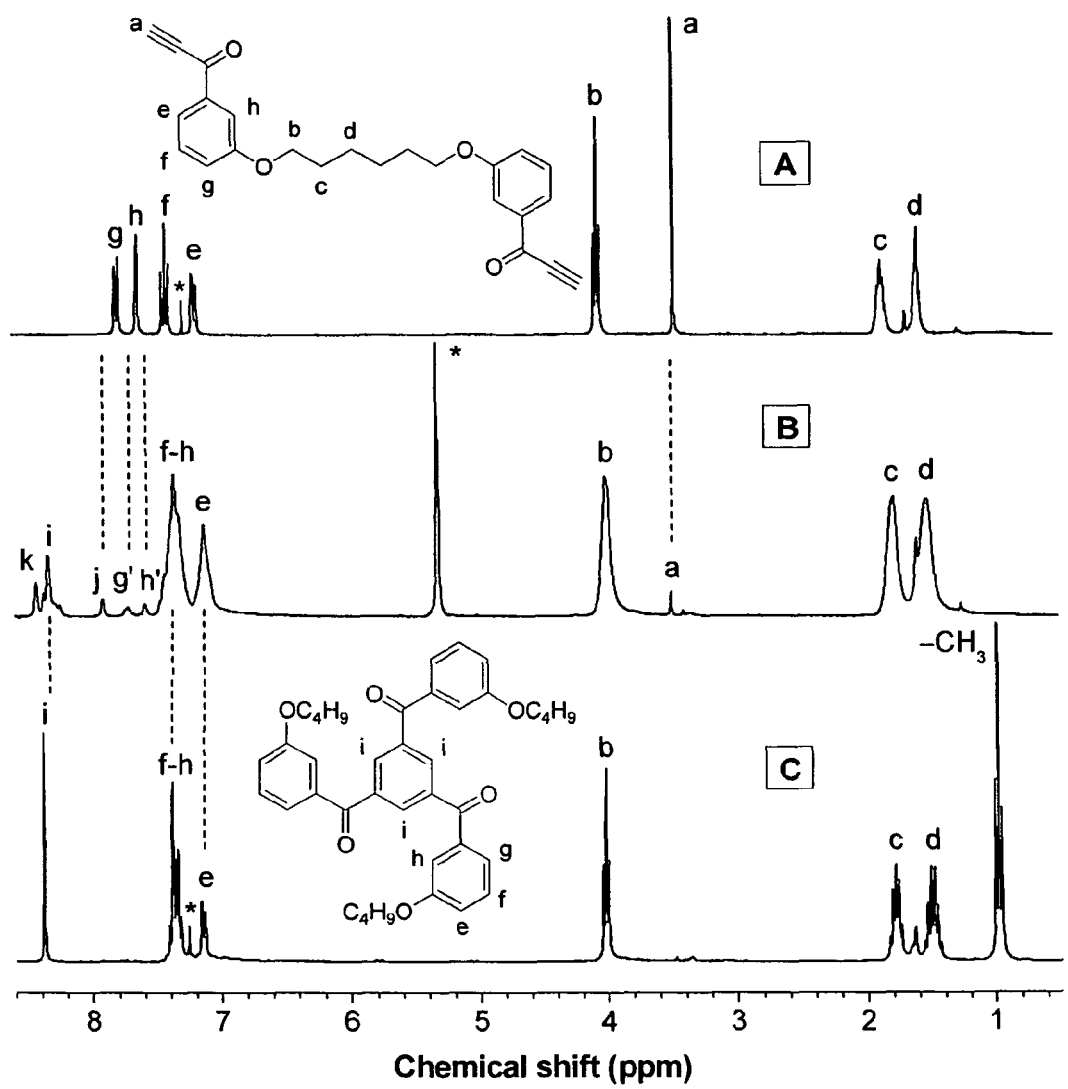
FIG. 4 is $^1$H NMR spectra of 3,3'-(1,6-hexylenedioxy) bis(benzoylacetylene) (A), its polymer I (B), and model compound 1,3,5-tri(4-butyloxybenzoyl)benzene(C). The solvent peaks are marked with asterisks (*)
Figure 11:
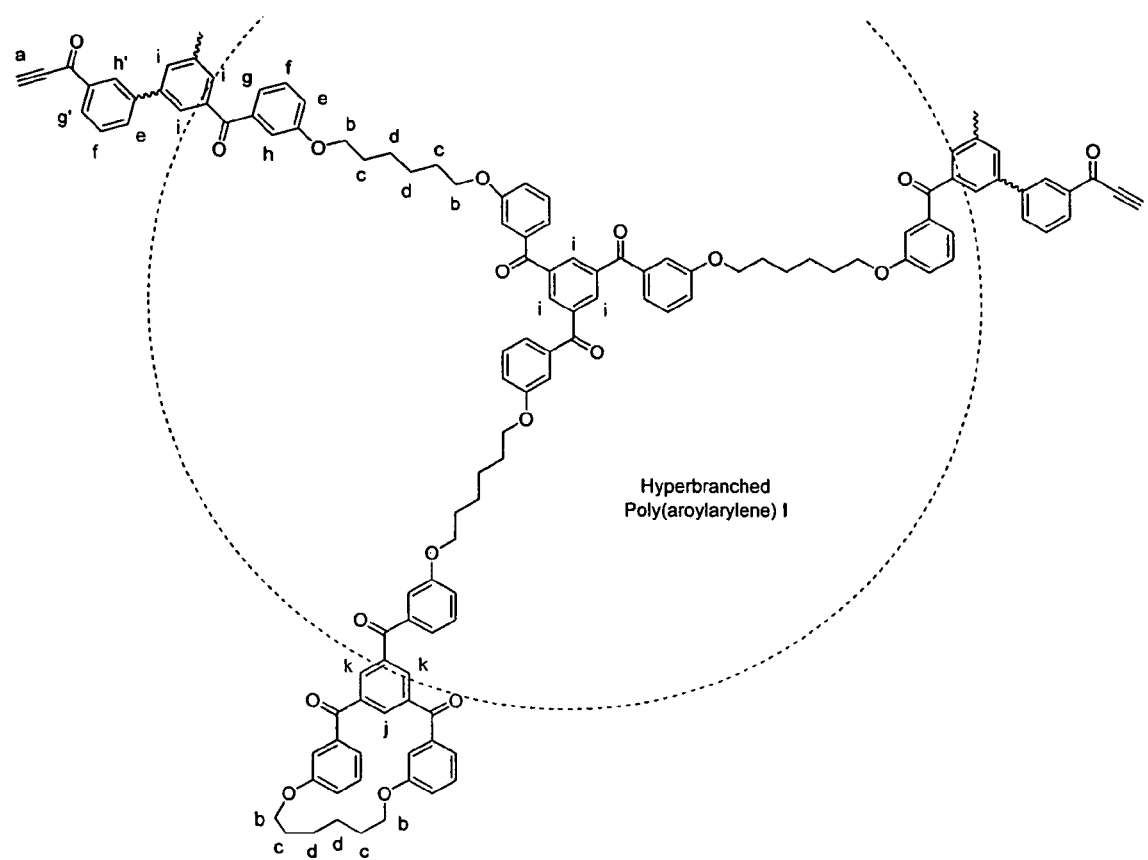
FIG. 11 is partial molecular structure of hyperbranched poly(aroylarylene) I with a labeling scheme for FIG. 3B.

The $^1$H NMR spectrum of I well corresponds to its expected molecular structure, with no peaks unassignable (FIG. 4B and FIG. 11). The acetylene proton of its monomer absorbs at δ 3.50 (a), which becomes much weaker after polymerization. The polymerization shifts the resonances of the phenyl protons of its monomer at δ7.76 (g) and 7.63 (h) to δ 7.40, with the phenyl protons on the periphery of I resonated at δ 7.72 (g') and 7.59 (h'). By comparison with the spectrum of model compound, the peak of I at δ~8.33 (i) is readily assigned to the protons of the new benzene rings formed in the polymerization. The peaks at δ 8.43 (k) and 7.91 (O) arise from the resonance of tribenzoylphenyl protons of the cyclophane formed by the end-capping of a triple bond in a polymer branch by two triple bonds in a monomer.

Figure 5:
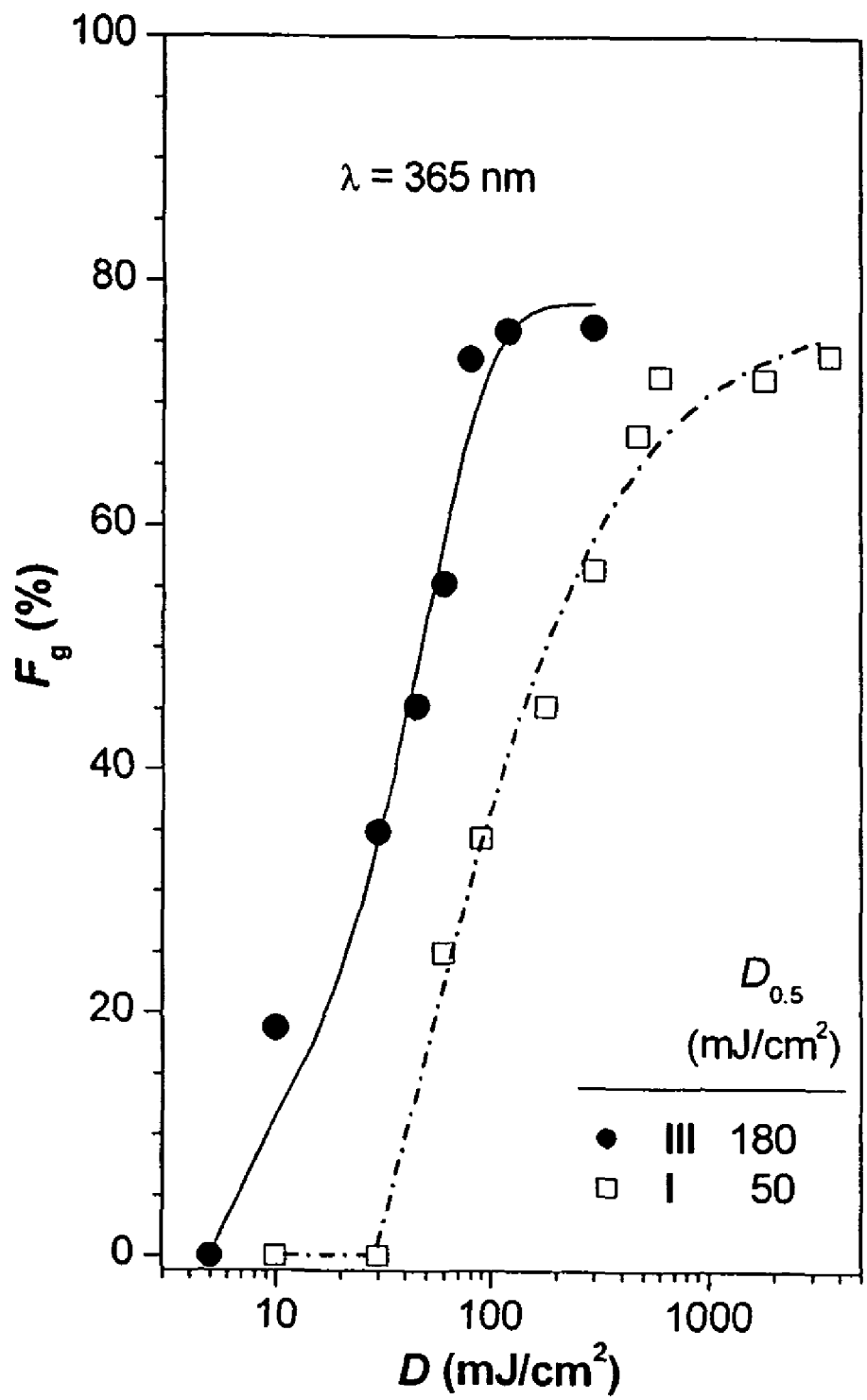
FIG. 5 shows plots of gel fractions of I and III films versus exposure doses.
Figure 6:
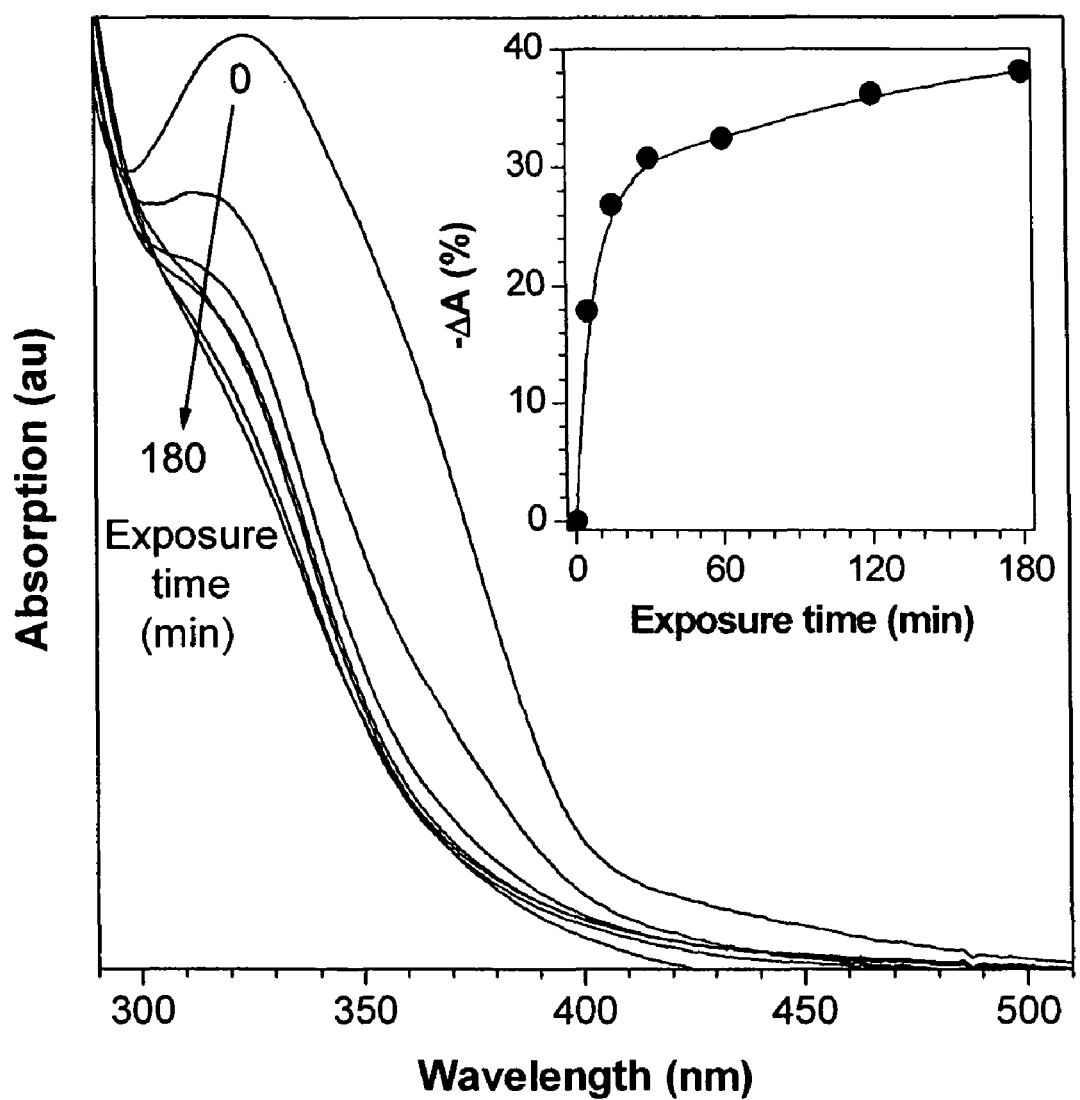
FIG. 6 shows the change in the UV spectrum of a III film with exposure time; irradiation wavelength λ=365 nm; ΔA= $(A-A_0) \times 100\%$, where $A_0$ is the absorption of the original (unirradiated) polymer film.
Figure 7:
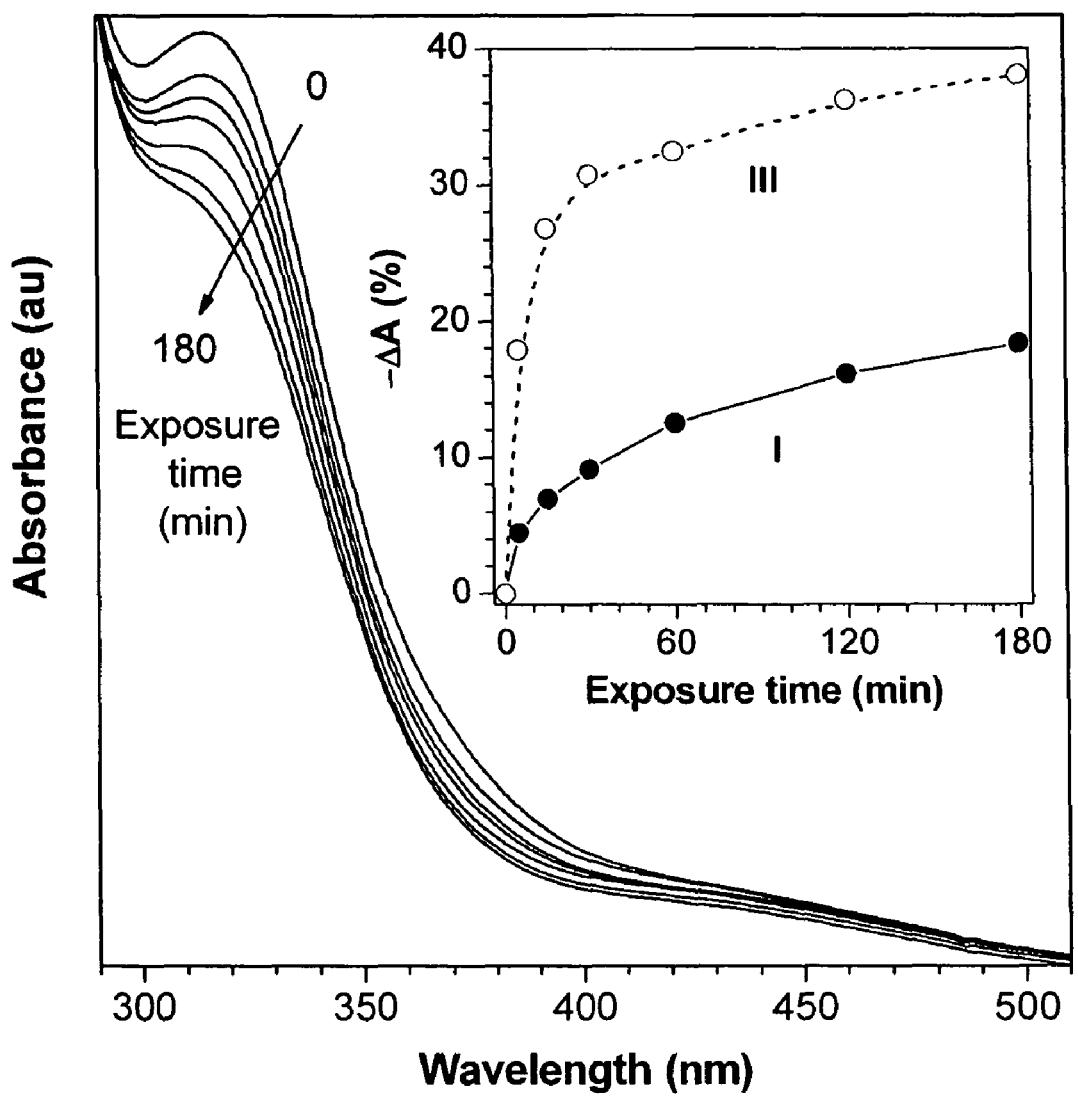
FIG. 7 shows the change in the UV spectrum of a I film with exposure time; irradiation wavelength λ=365 nm; ΔA=(A-$A_0$)×100%, where $A_0$ is the absorption of the original (unirradiated) polymer film. Data for the III film are shown in the inset of panel B for comparison.

FIG. 5 depicts the dose effect on the gel formation of I and III films after they have been exposed to a weak UV light (~1 $mW/cm^2$). Although the photo-cross-linking conditions have not been optimized, both polymers already exhibit sensitivities ($D_{0.5}$=50-180 $mJ/cm^2$) better than those of some commercial negative resists (NRs) such as NR1-3000RY and NR9-3000P (both 190 $mJ/cm^2$) and NR7-1000PY (390 $mJ/cm^2$) [(a) *Materials for Microlithography*; Thompson, L. F., Wilson, C. G., Frechet, J. M. J., Eds.; American Chemical Society: Washington, D.C., 1984. (b) Macromolecules 2001, 34, 8925. Internet: (c) http://www.ee.udel.edu/~xuan/research/public/photoresist_recipe/NR1-3000PY.html. (d) http://davidlu.net/msds.htm.]. Compared to I, III shows lower $D_{0.5}$ and higher 0.5 (contrast). This is possibly due to the more rapid reduction of the ketone group in III, thanks to the ease in abstracting hydrogen from its benzyl unit. This hypothesis is supported by the fact that the K band of the tAB units of III drops much faster than that of I (FIGS. 6 and 7).

Figure 8:
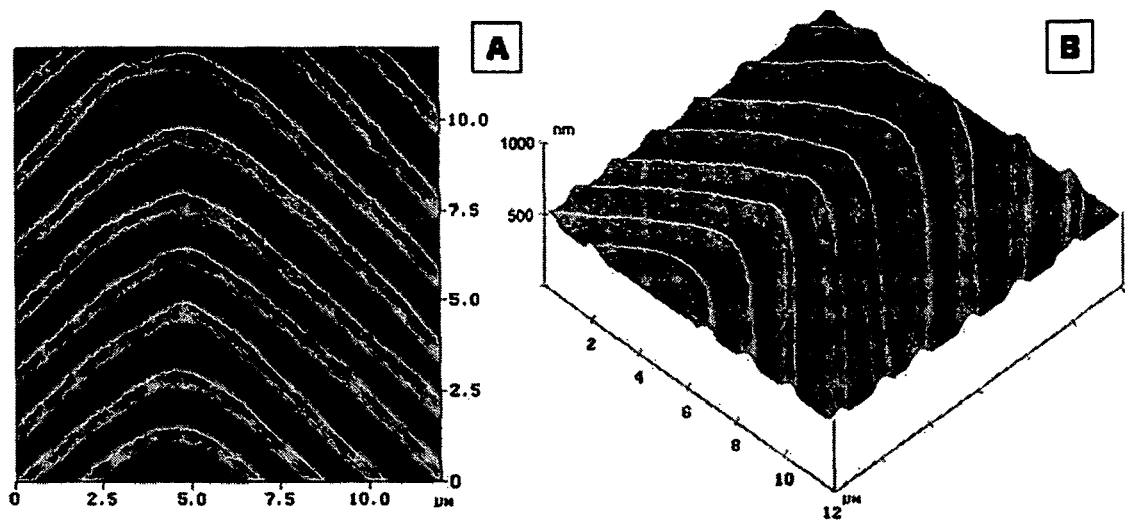
FIG. 8 shows (A) two- and (B) three-dimensional AFM images of the nanometer-sized photoresist pattern generated by a III film irradiated by a 365-nm UV light with an exposure dose of 1 J/cm$^2$.
Figure 9:
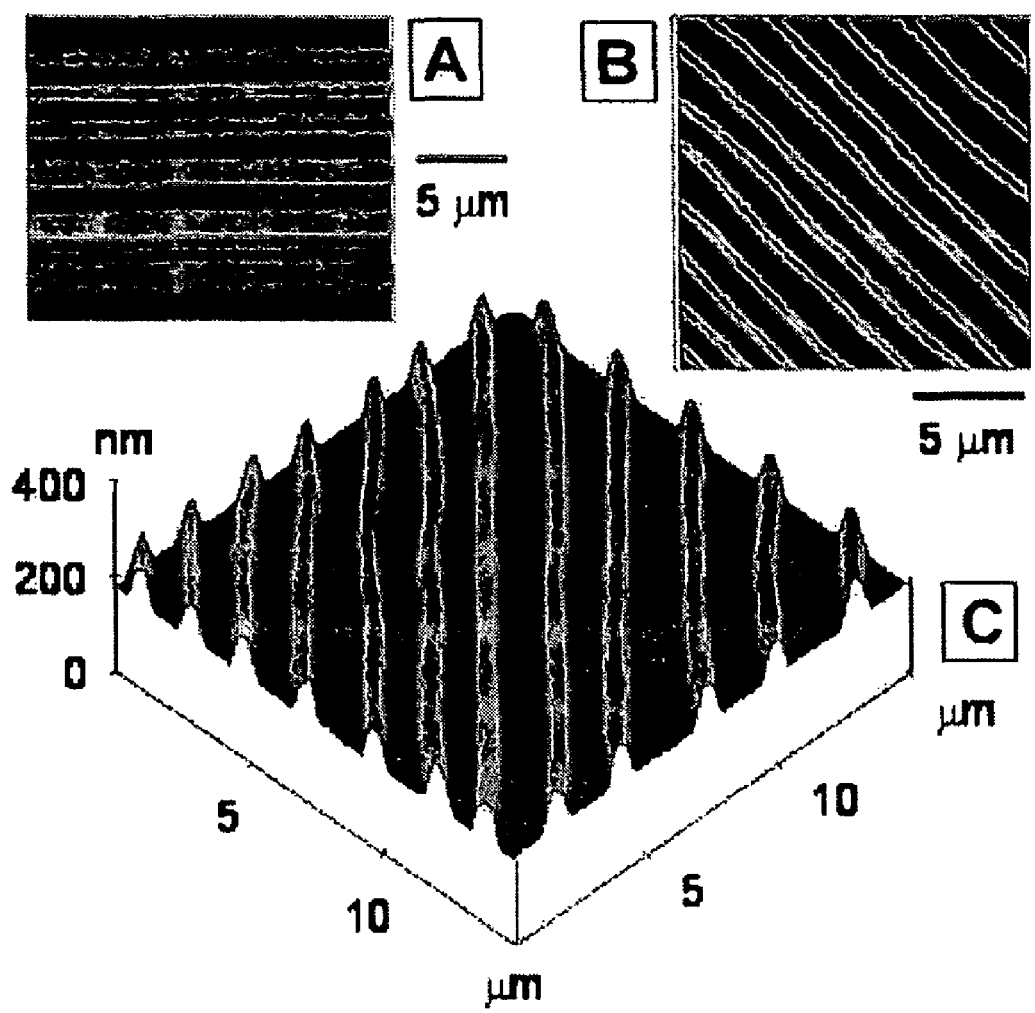
FIG. 9 shows AFM images of micro- and nano-scale patterns obtained from III films exposed to 1 J/cm$^2$ of UV irradiation.

Well-resolved patterns with line widths of 1.0 and 1.5 μm are readily obtained when a film of III has been exposed to a UV dose of 1 $J/cm^2$ (FIG. 8). Patterns with submicron resolutions (line width down to 500 nm) are also achievable, as demonstrated by the examples given in FIG. 9 (panels B and C). Clearly, III is an excellent photoresist material.

Figure 10:
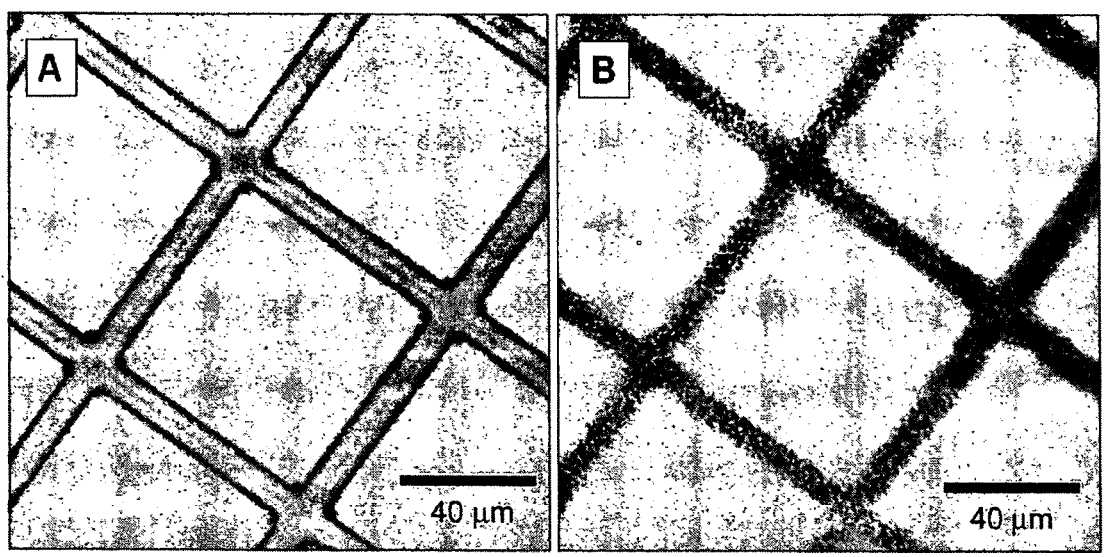
FIG. 10 shows Optical micrographs of photopatterns of IX fabricated by UV photolithography before (A) and after (B) pyrolysis (1000° C., 1 h) under nitrogen.

Benzophenone is well known to serve as a photo-cross-linker. The ferrocene-containing hyperbranched polymer IX contains many triaroylbenzene units and may thus show high photo-cross-linking efficiencies. This is indeed the case. FIG. 10A shows the optical micrograph of thin-films of IX coated on silicon wafers after treated by UV light. In this case, the unexposed parts were completely removed by the organic solvent, leaving behind well-resolved patterns with sharp edges. Ceramization of the silicon wafers of IX in a tube furnace at 1000° C. for 1 h under a steam of nitrogen gives ceramic pattern with excellent shape retention with respect to their polymer precursors (FIG. 10B). Close inspection of the ceramic pattern under higher magnification reveals a morphology transformation from a uniform thin-film into a congeries of tiny ceramic clusters.

In the foregoing description of the invention, there is no intention to be bound by any expressed or implied theory presented in explaining the properties of the polymers of the present invention.

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A soluble polymer, comprising a plurality of end units and a plurality of internal units, said internal unit being of formula (1a)

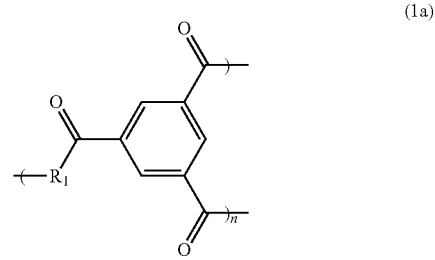

(1a)

wherein n is greater than 1; $R_1$ is the remainder of a diaroylacetylene and other said internal units have identical $R_1$ or different $R_1$; and wherein said polymer is soluble in a solvent selected from the group consisting of tetrahydrofuran, chloroform, and dimethylformamide; and wherein the number of said internal units is at least about 10.

2. The polymer of claim 1, wherein the number of said internal units is between about 10 and about 100.

3. The polymer of claim 1, wherein said $R_1$ is the same in all said internal units.

4. The polymer of claim 3, wherein said $R_1$ of said internal units is each independently selected from the group consisting of:

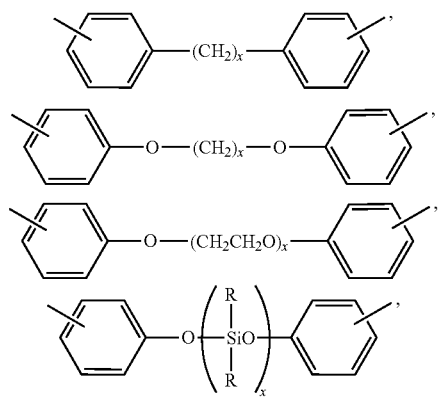

-continued
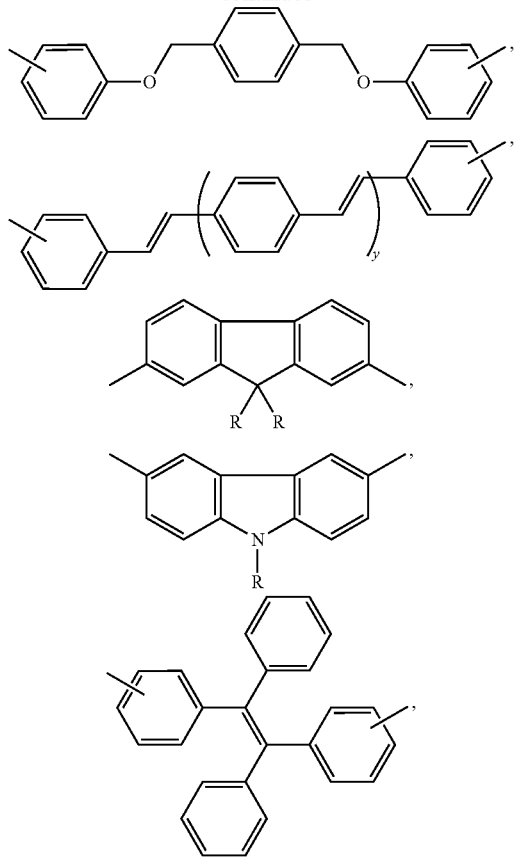
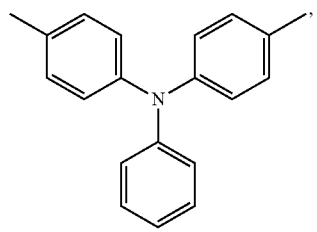
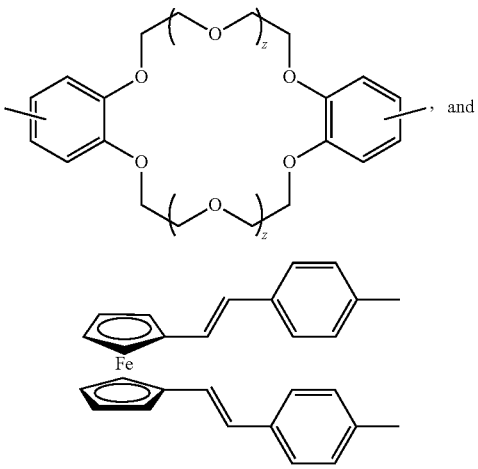
wherein x, y, and z, are ≧1; and R is alkyl, vinyl, acetyl, aryl, heteroaryl, cycloalkyl, heterocycloalkyl, or heteroalkyl.
5. The polymer of claim 1, wherein said internal unit is selected from the group consisting of:
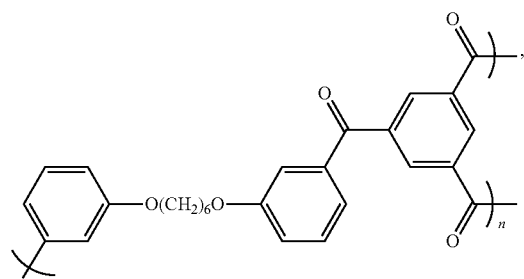
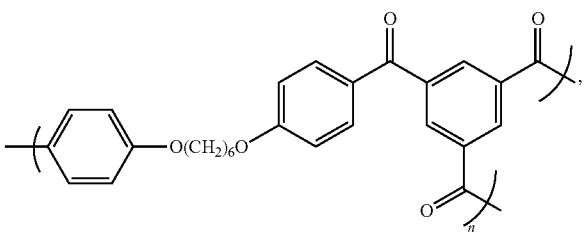
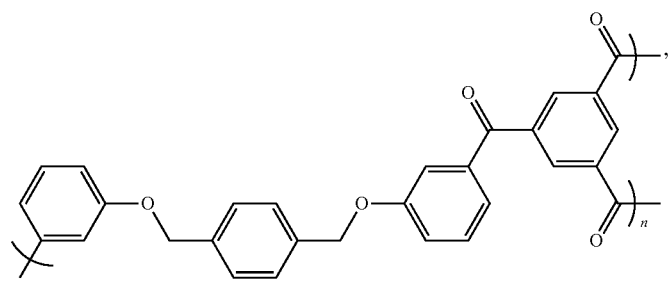
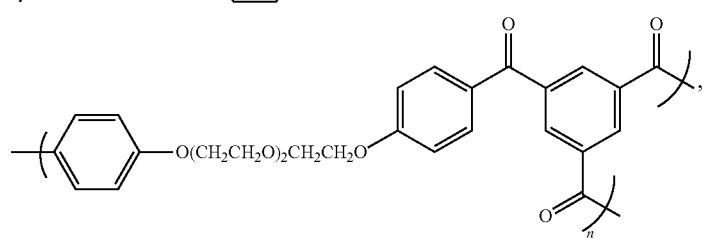

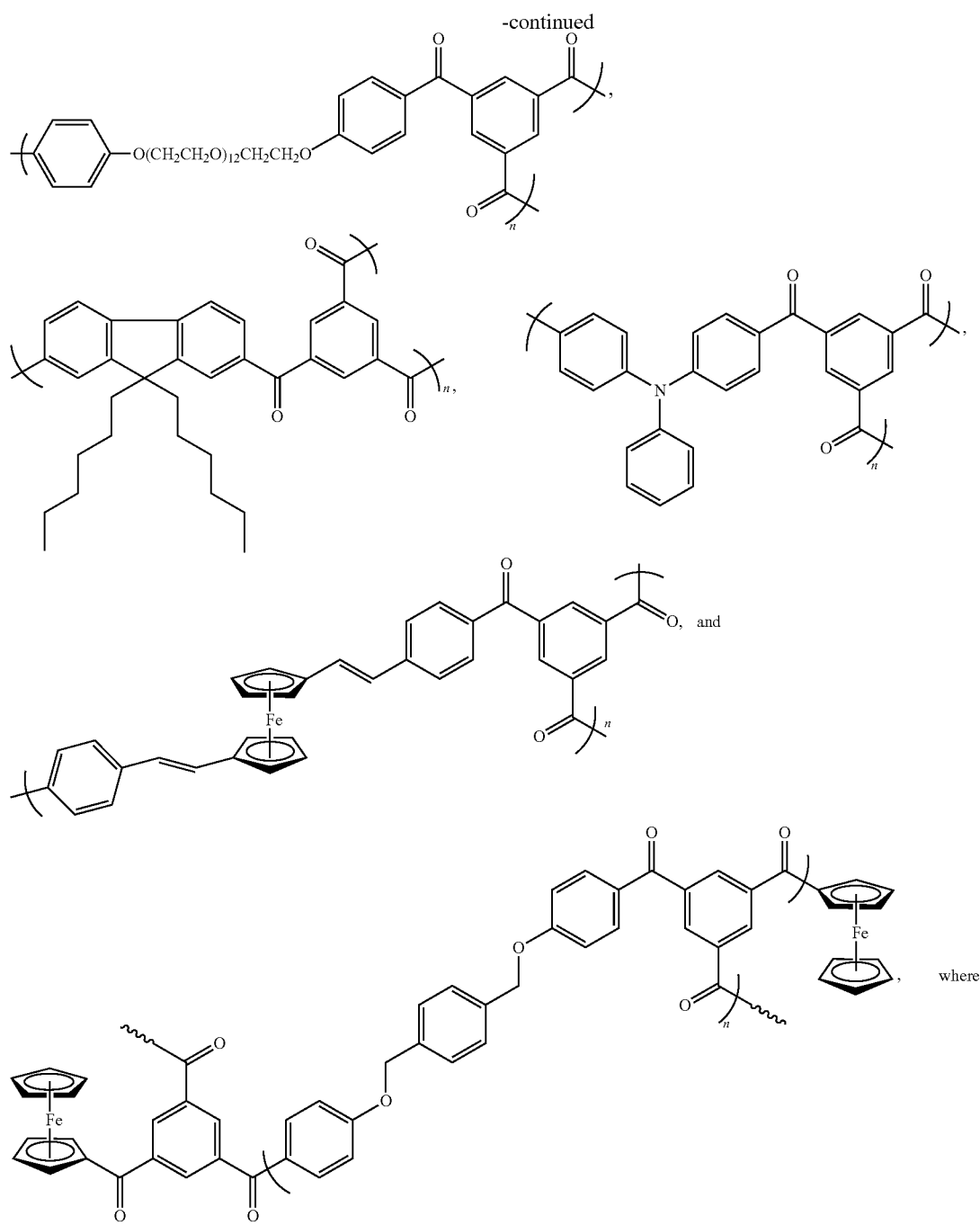
6. The polymer of claim 5, wherein said internal unit is:
7. The polymer of claim 5, which is:
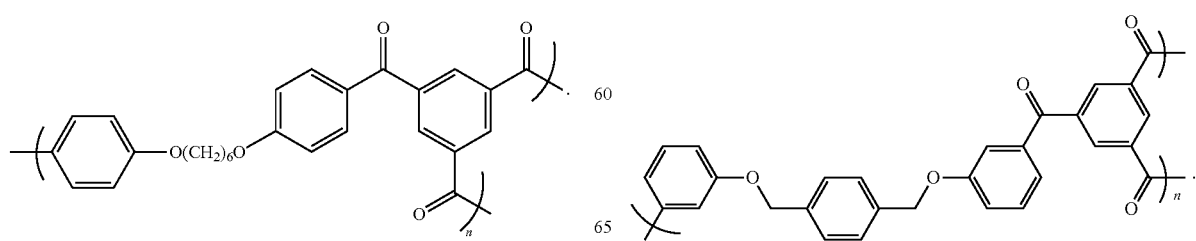

8. The polymer of claim 5, which is:

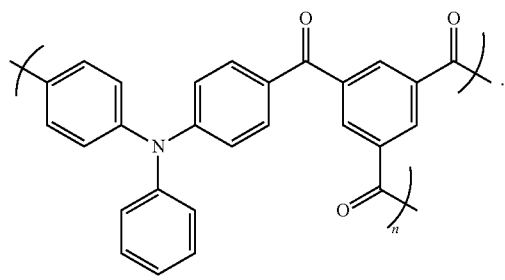

9. The polymer of claim 5, which is:

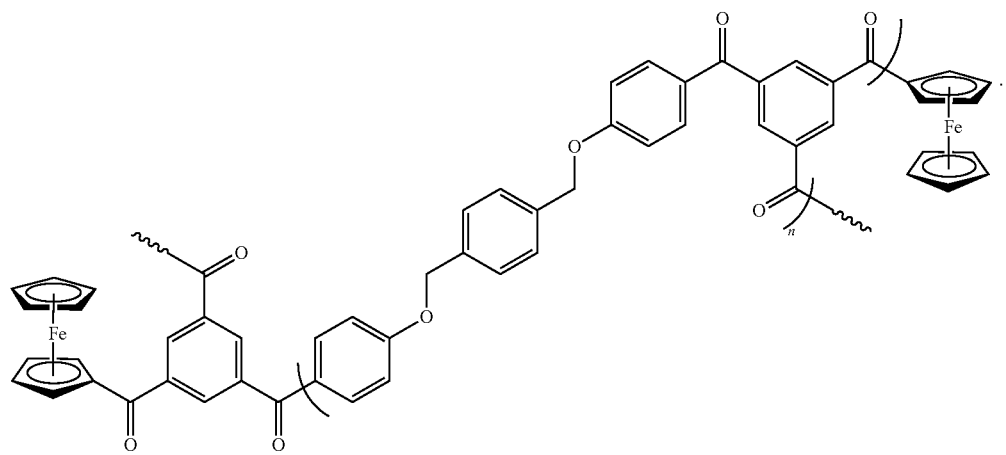

10. A method of making a polymer of claim 1, comprising the following polymerization step:

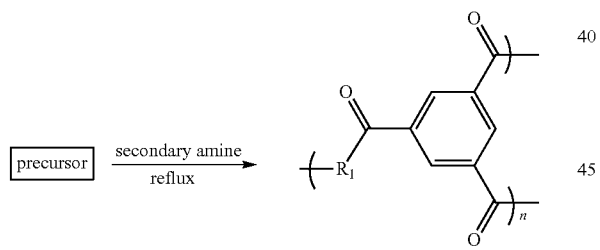

wherein said precursor comprises one or more diaroylacetylenes; and R1 is the remainders of said one or more diaroylacetylenes.

11. The method of claim 10, wherein said polymerization is conducted by refluxing with piperdine.

12. The method of claim 11, wherein said polymerization is conducted by refluxing with piperdine and N2.

13. The method of claim 11, wherein said precursor comprises diaroylacetylenes of the following formulae:

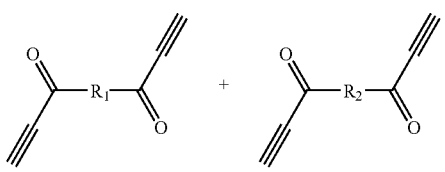

wherein $R_1$ and $R_2$ are remainders of diaroylacetylenes which are identical or different.

14. The method of claim 13, wherein $R_1$ and $R_2$ are independently selected from the group consisting of:

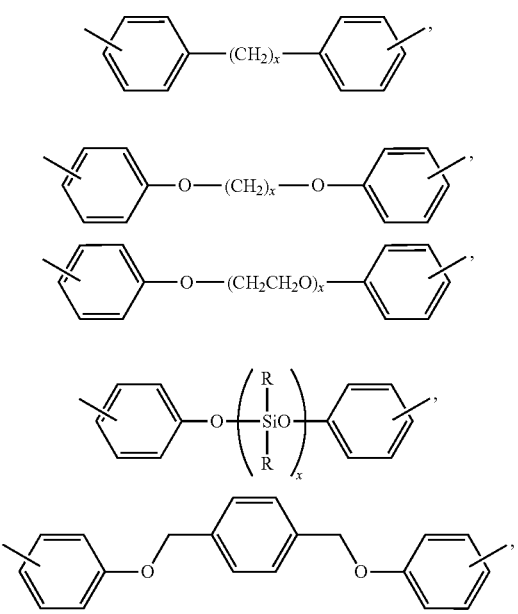

-continued

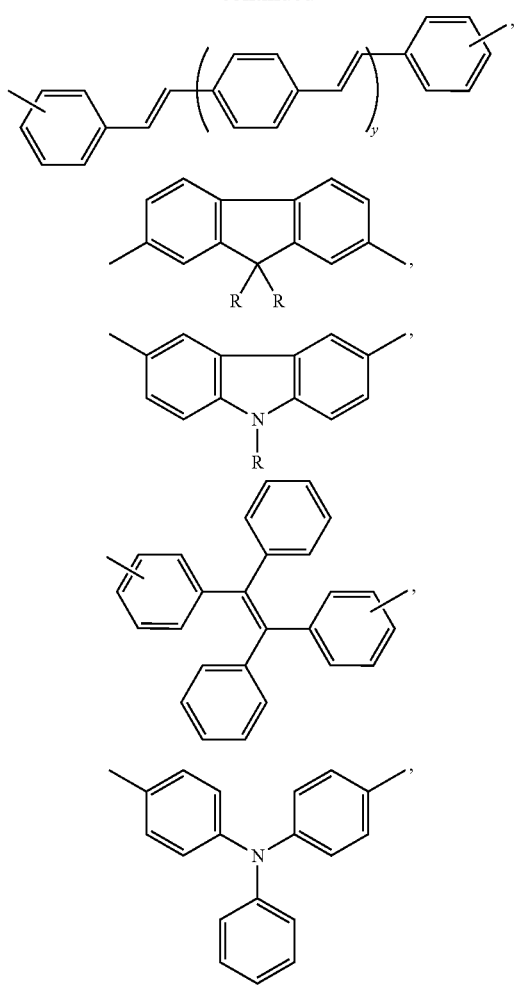

-continued

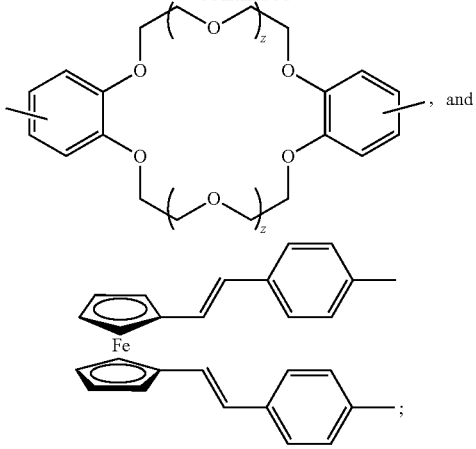

wherein x, y, and z, are: 2:1; R and is alkyl, vinyl, acetyl, aryl, heteroaryl, cycloalkyl, heterocycloalkyl, or heteroalkyl.

15. The method of claim 14, wherein $R_1$ and $R_2$ are identical.

16. The method of claim 15, wherein said polymerization is conducted for at least about 20 hours.

17. The method of claim 16, wherein said polymerization is conducted for about 24 hours.

18. The method of claim 10, wherein said precursor further comprises one or more monoynes for end-capping of said polymer.

19. A method for patterning comprising a step of applying an energy source to the polymer of claim 1.

20. The method of claim 19, wherein said energy source is UV-irradiation.

21. The method of claim 19, wherein said energy source is e-beam or laser.

22. A thermoset, formed by heating the polymer of claim 1 to 200° C.

* * * * *